US012673430B2

(12) United States Patent
Ichihara et al.

(10) Patent No.: US 12,673,430 B2
(45) Date of Patent: Jul. 7, 2026

(54) CONTROL DEVICE, CONTROL METHOD, AND NON-TRANSITORY RECORDING MEDIUM

(71) Applicant: NEC Corporation, Tokyo (JP)

(72) Inventors: Eiji Ichihara, Tokyo (JP); Kosei Kobayashi, Tokyo (JP); Satsuki Hamaguchi, Tokyo (JP); Taiga Iyoku, Tokyo (JP); Arisa Morozumi, Tokyo (JP); Ryosuke Shirai, Tokyo (JP); Yoji Ohnishi, Tokyo (JP); Hiroaki Aminaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 186 days.

(21) Appl. No.: 18/509,852

(22) Filed: Nov. 15, 2023

(65) Prior Publication Data

US 2024/0238983 A1 Jul. 18, 2024

(30) Foreign Application Priority Data

Jan. 18, 2023 (JP) ................................. 2023-006128

(51) Int. Cl.
| | |
|---|---|
| *B25J 11/00* | (2006.01) |
| *B25J 19/02* | (2006.01) |
| *G06V 10/70* | (2022.01) |
| *G06V 40/16* | (2022.01) |

(52) U.S. Cl.
CPC .......... *B25J 11/008* (2013.01); *B25J 11/0005* (2013.01); *B25J 19/023* (2013.01); *G06V 10/70* (2022.01); *G06V 40/172* (2022.01); *G06V 40/174* (2022.01)

(58) Field of Classification Search
CPC .... B25J 11/008; B25J 11/0005; B25J 19/023; G06V 10/70; G06V 40/172; G06V 40/174
See application file for complete search history.

(56) References Cited

U.S. PATENT DOCUMENTS

| | | | | |
|---|---|---|---|---|
| 7,720,572 | B2 * | 5/2010 | Ziegler ................. | B25J 11/008 |
| | | | | 713/153 |
| 10,726,836 | B2 * | 7/2020 | Baik ........................ | G10L 25/57 |
| 10,796,098 | B2 * | 10/2020 | Sugiura ................... | G06F 40/30 |
| 10,969,791 | B1 * | 4/2021 | Ebrahimi Afrouzi ........................ | |
| | | | | G05D 1/0214 |
| 11,151,386 | B1 * | 10/2021 | Aggarwal .............. | H04N 21/84 |
| 11,780,098 | B2 * | 10/2023 | Watanuki ............... | B25J 11/001 |
| | | | | 700/246 |
| 11,964,398 | B2 * | 4/2024 | Pekarek-Kostka .... | B25J 13/086 |

(Continued)

FOREIGN PATENT DOCUMENTS

| | | | | | |
|---|---|---|---|---|---|
| CN | 113290567 | A | * | 8/2021 | .......... B25J 11/0005 |
| CN | 111400687 | B | * | 2/2024 | ............. G06F 21/32 |

(Continued)

OTHER PUBLICATIONS

JP_2023117849_A_I_translation (Year: 2023).*

(Continued)

*Primary Examiner* — Kyle T Johnson

(57) ABSTRACT

A control device according to one aspect of the present disclosure identifies a first person, acquires information on a second person related to the first person, and reads out an action information using the information on the second person, the action information representing an action of the second person for the first person.

19 Claims, 16 Drawing Sheets

(56)                   References Cited

U.S. PATENT DOCUMENTS

| | | | | |
|---|---|---|---|---|
| 2005/0154265 | A1* | 7/2005 | Miro | G07C 9/37 704/E15.045 |
| 2007/0192910 | A1* | 8/2007 | Vu | H04N 7/142 901/1 |
| 2011/0302293 | A1* | 12/2011 | Buban | G06V 40/20 709/227 |
| 2013/0127620 | A1* | 5/2013 | Siebers | A61B 5/1113 340/573.1 |
| 2016/0110772 | A1* | 4/2016 | Herring | G06V 40/172 705/14.66 |
| 2017/0228520 | A1* | 8/2017 | Kidd | G16H 20/13 |
| 2017/0236176 | A1* | 8/2017 | Johansson | H04M 3/5233 705/7.13 |
| 2017/0308909 | A1* | 10/2017 | Faith | G06V 40/176 |
| 2017/0337602 | A1* | 11/2017 | Davis | G06V 40/174 |
| 2019/0001489 | A1* | 1/2019 | Hudson | B25J 9/1602 |
| 2019/0102667 | A1* | 4/2019 | Bashkirov | G06V 10/764 |
| 2020/0094397 | A1* | 3/2020 | Young | B25J 13/08 |
| 2020/0285248 | A1* | 9/2020 | Kim | G06T 7/70 |
| 2020/0411015 | A1* | 12/2020 | Kim | B25J 9/163 |
| 2021/0051152 | A1* | 2/2021 | Gallopyn | G16H 10/60 |
| 2021/0342856 | A1* | 11/2021 | Watanabe | G06Q 30/0201 |
| 2021/0373576 | A1* | 12/2021 | Sohn | B25J 11/008 |
| 2022/0035903 | A1* | 2/2022 | Kim | B25J 9/1656 |
| 2022/0301029 | A1* | 9/2022 | Ito | G06Q 30/0617 |
| 2022/0355487 | A1* | 11/2022 | Rose | B25J 9/1689 |
| 2023/0141862 | A1* | 5/2023 | Eadelman | G06V 40/168 382/103 |
| 2024/0238983 | A1* | 7/2024 | Ichihara | B25J 11/0005 |
| 2025/0054333 | A1* | 2/2025 | Lee | G06T 11/00 |

FOREIGN PATENT DOCUMENTS

| | | | | | |
|---|---|---|---|---|---|
| JP | 2010-052079 | A | | 3/2010 | |
| JP | 2019-032778 | A | | 2/2019 | |
| JP | 2022-000143 | A | | 1/2022 | |
| JP | 2023117849 | A | * | 8/2023 | |
| KR | 20180038850 | A | * | 4/2018 | B25J 11/0085 |
| WO | WO-2022185542 | A1 | * | 9/2022 | G06Q 30/02 |
| WO | WO-2022245783 | A2 | * | 11/2022 | H04N 23/90 |

OTHER PUBLICATIONS

KR_20180038850_A_I_translation (Year: 2018).*
WO_2022185542_A1_I_translation (Year: 2022).*
CN-113290567-A tanslation (Year: 2021).*
CN-111400687-B translation (Year: 2024).*
Service_Robots_in_Health_Care_Sector_2021 (Year: 2021).*

* cited by examiner

Figure 1:
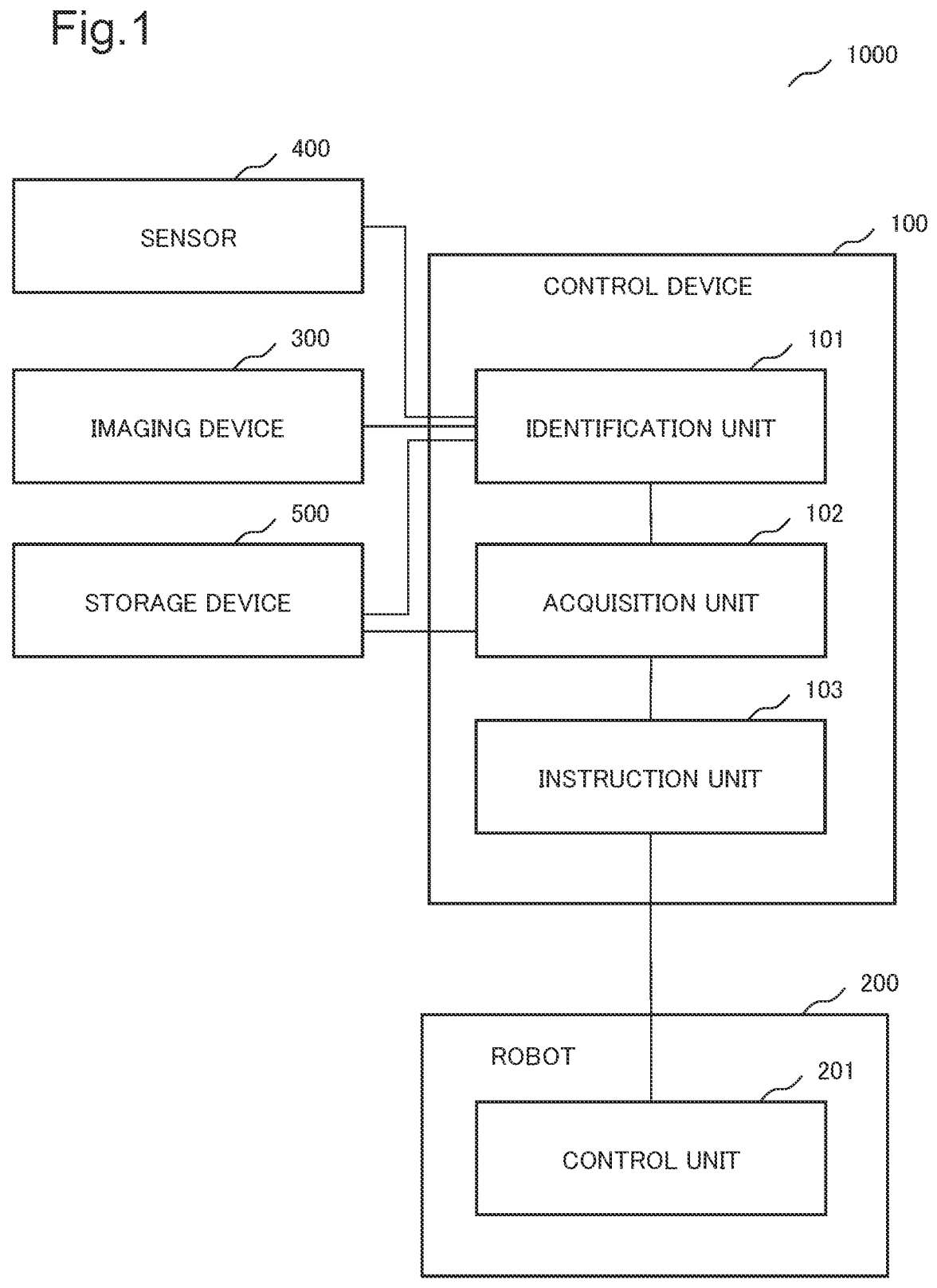

SENSOR

300

IMAGING DEVICE

500

STORAGE DEVICE

100

CONTROL DEVICE

101

IDENTIFICATION UNIT

102

ACQUISITION UNIT

103

INSTRUCTION UNIT

200

ROBOT

201

CONTROL UNIT

Figure 4:
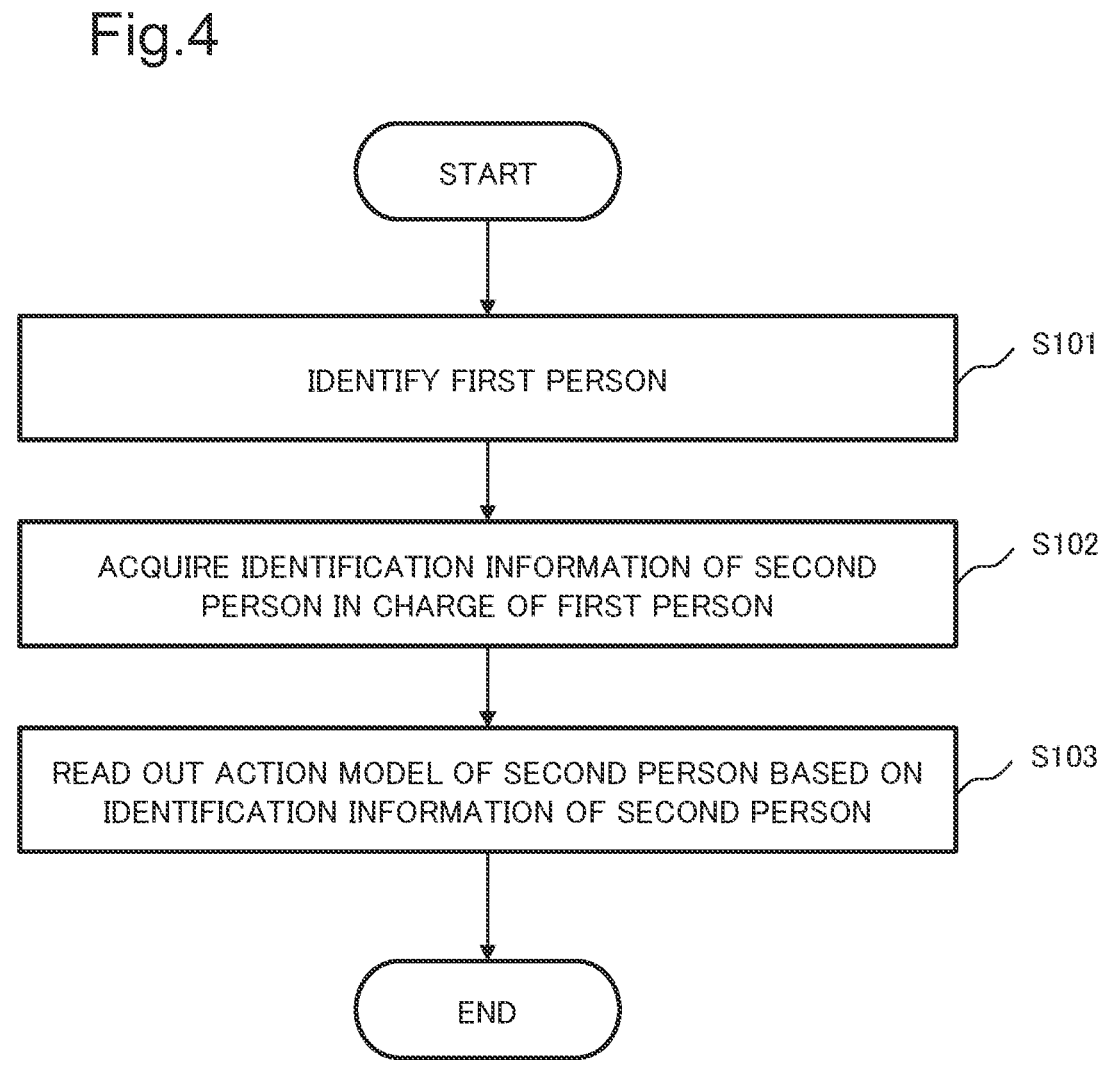

START

IDENTIFY FIRST PERSON    S101

ACQUIRE IDENTIFICATION INFORMATION OF SECOND PERSON IN CHARGE OF FIRST PERSON    S102

READ OUT ACTION MODEL OF SECOND PERSON BASED ON IDENTIFICATION INFORMATION OF SECOND PERSON    S103

END

Fig.10

| FIRST PERSON | SECOND PERSON | CLASSIFICATION | EVALUATION SCORE |
|:---:|:---:|:---:|:---:|
| 1A | 2A | RELAXED | 90 |
| 1A | 2B | RELAXED | 70 |
| 1A | 2C | ANGRY | 10 |

Figure 13:
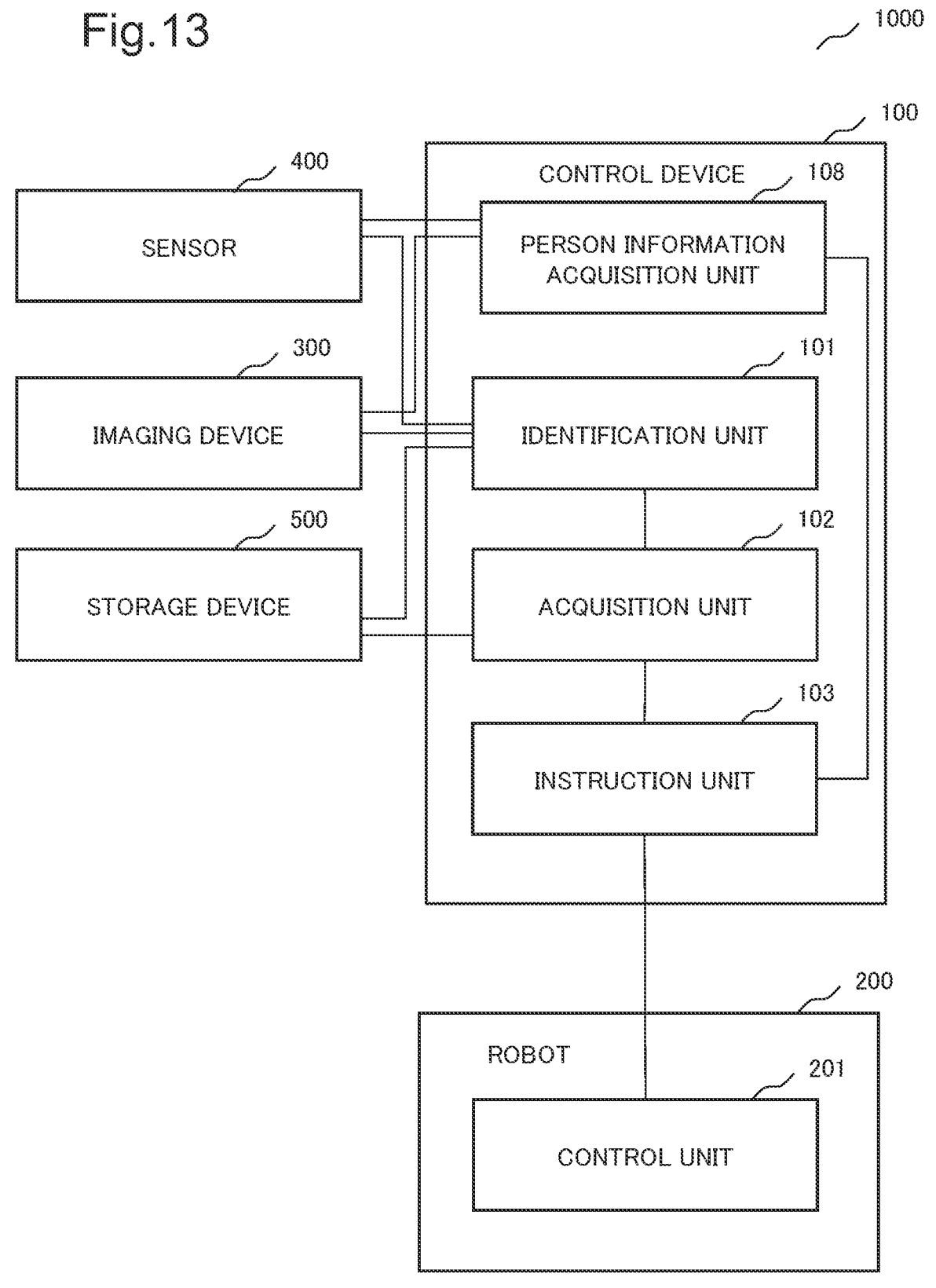

CONTROL DEVICE

400

SENSOR

108

PERSON INFORMATION
ACQUISITION UNIT

300

IMAGING DEVICE

101

IDENTIFICATION UNIT

500

STORAGE DEVICE

102

ACQUISITION UNIT

103

INSTRUCTION UNIT

200

ROBOT

201

CONTROL UNIT

Fig.14

| SECOND PERSON | ACTION MODEL | SERVICE PROVIDED TO FIRST PERSON | PHYSICAL CONDITION OF FIRST PERSON |
|---|---|---|---|
| 2A | 2A-1 | MEAL ASSISTANCE | – |
| 2A | 2A-2 | WALKING ASSISTANCE | – |
| 2A | 2A-3 | BATHING ASSISTANCE | – |
| 2B | 2B-1 | MEAL ASSISTANCE | – |
| 2B | 2B-2 | WALKING ASSISTANCE | GOOD |
| 2B | 2B-3 | WALKING ASSISTANCE | BAD |

Fig.15

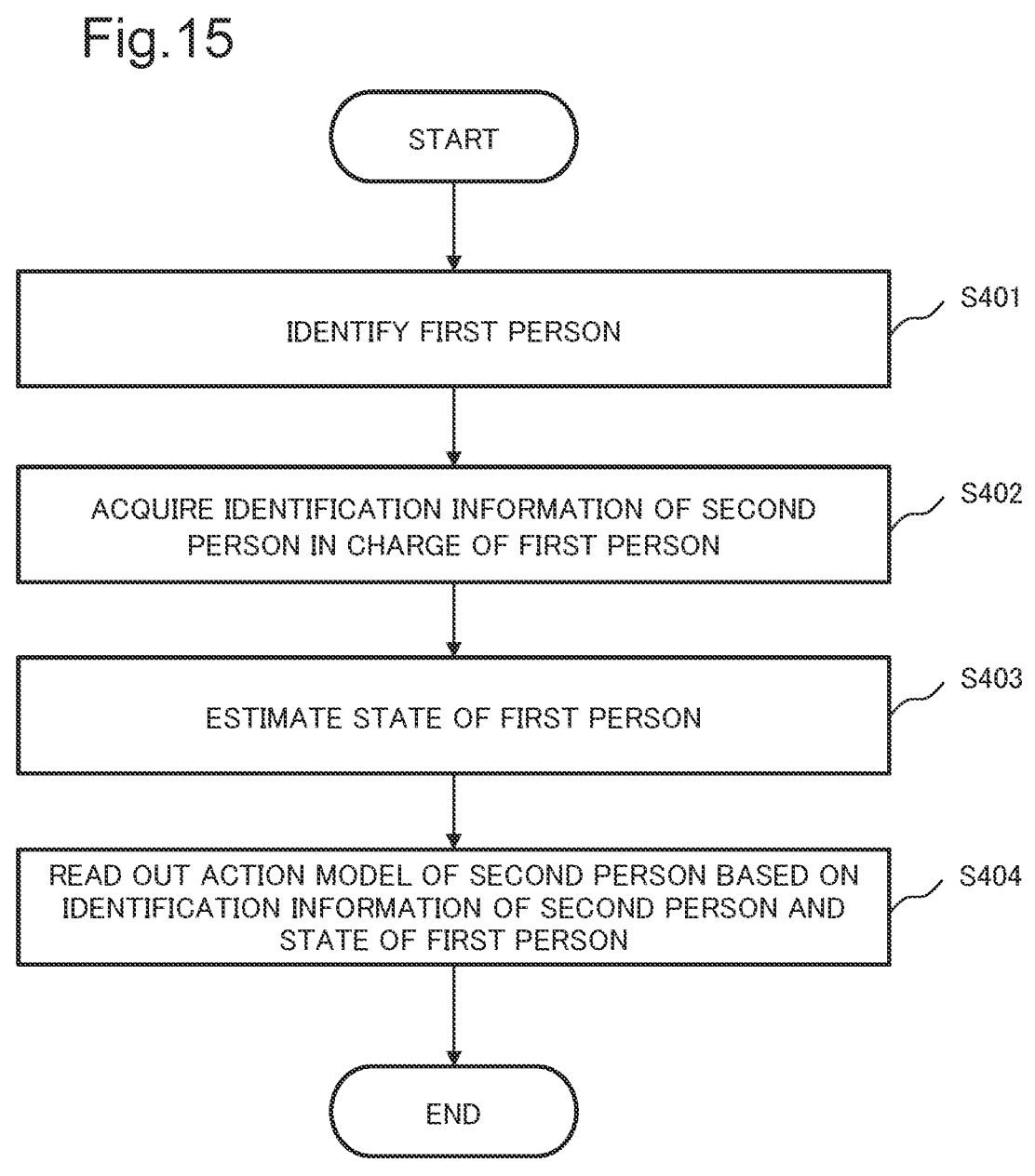

START

IDENTIFY FIRST PERSON — S401

ACQUIRE IDENTIFICATION INFORMATION OF SECOND PERSON IN CHARGE OF FIRST PERSON — S402

ESTIMATE STATE OF FIRST PERSON — S403

READ OUT ACTION MODEL OF SECOND PERSON BASED ON IDENTIFICATION INFORMATION OF SECOND PERSON AND STATE OF FIRST PERSON — S404

END

1

CONTROL DEVICE, CONTROL METHOD, AND NON-TRANSITORY RECORDING MEDIUM

This application is based upon and claims the benefit of priority from Japanese Patent Application No. 2023-006128, filed on Jan. 18, 2023, the disclosure of which is incorporated herein in its entirety by reference.

TECHNICAL FIELD

The present disclosure relates to a control device, a control method, and a computer program for performing control to provide a service to a user.

BACKGROUND ART

In recent years, robots have been spreading in various fields.

In the care field, for example, a robot as disclosed in a reference document (JP 2010-052079 A) has been known. The care robot described in the reference document picks up a physicalcare receiver sitting on a bed and moves the physicalcare receiver to a wheelchair.

The detail (mode) of the service varies depending on who the person providing the service is. In addition, in a physicalcare service or in a customer service, a person in charge who provides the service may be determined in advance for each user. Therefore, when it is attempted to make the robot to perform some of the work performed by the person in charge, the service provided by the robot may be different from the service provided by the person in charge. As a result, the user may feel uncomfortable about the service provided by the robot.

SUMMARY

The present disclosure has been made to solve the above-described problem, and an object of the present disclosure is to provide a control device and the like capable of reducing discomfort felt by a user when a robot provides a service.

An exemplary object of the invention is to provide a storage apparatus, a storage system and a control method for the storage apparatus, which may resolve the problem of deterioration in performance.

A control device according to one aspect of the present disclosure includes one or more memories storing instructions, and one or more processors configured to execute the instructions to identify a first person, acquire information on a second person related to the first person, and read out an action information using the information on the second person, the action information representing an action of the second person for the first person.

A control method performed by a computer according to one aspect of the present disclosure includes identifying a first person, acquiring information on a second person related to the first person, and reading out an action information using the information on the second person, the action information representing an action of the second person for the first person.

A non-transitory recording medium according to one aspect of the present disclosure records a program for causing a computer to execute identifying a first person, acquiring information on a second person related to the first person, and reading out an action information using the information on the second person, the action information representing an action of the second person for the first person.

BRIEF DESCRIPTION OF THE DRAWINGS

Exemplary features and advantages of the present invention will become apparent from the following detailed description when taken with the accompanying drawings in which:

FIG. 1 is a diagram illustrating an example of a configuration of a providing system 1000 according to a first example embodiment:

FIG. 2 is a diagram illustrating an example of a configuration of a providing system 1000 according to the first example embodiment:

FIG. 4 is a flowchart illustrating an example of an operation of the control device 100 according to the first example embodiment:

FIG. 10 is an example of information generated by an evaluation calculation unit 106 by associating evaluation scores with person-in-charge information:

FIG. 13 is a diagram illustrating an example of a configuration of a providing system 1000 according to a fourth example embodiment:

FIG. 14 is a diagram for explaining an action model of a second person held by a storage device 500 according to the fourth example embodiment;

FIG. 15 is a flowchart illustrating an example of an operation of a control device 100 according to the fourth example embodiment.

EXAMPLE EMBODIMENT

Figure 3:
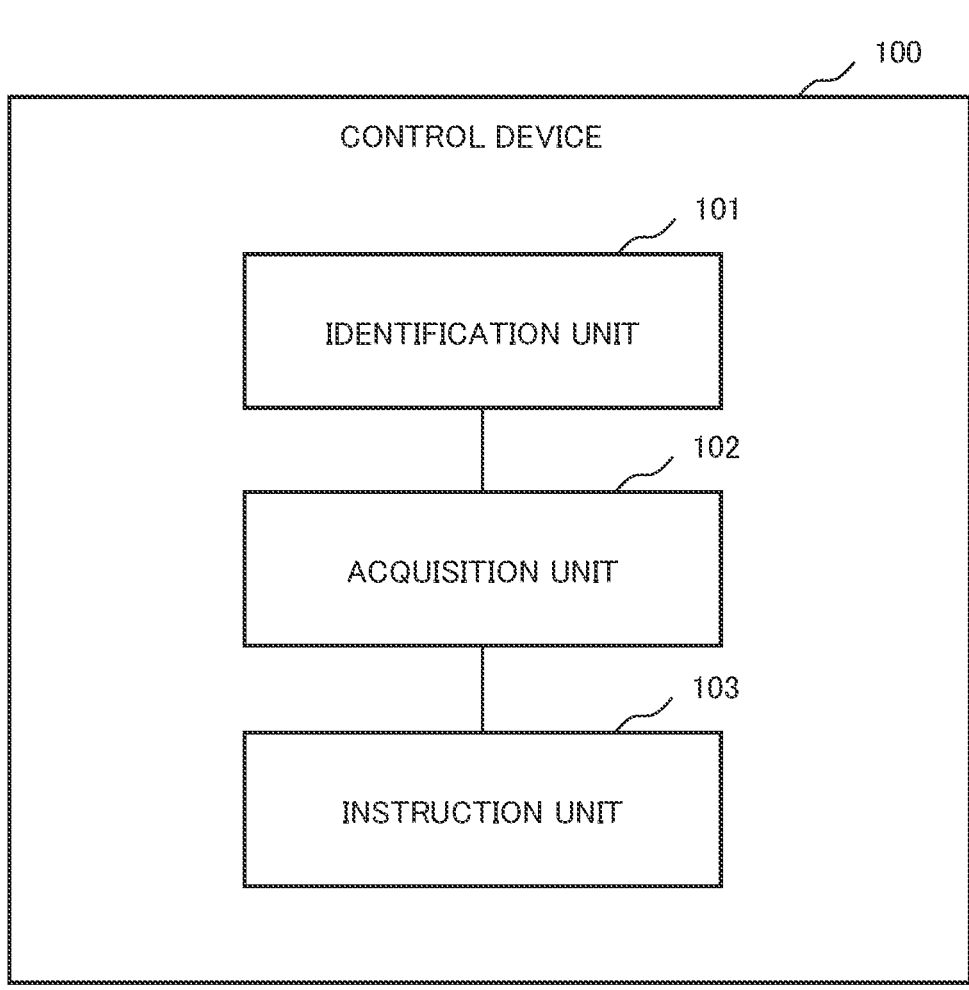
FIG. 3 is a diagram illustrating an example of a configuration of a control device 100 according to the first example embodiment.

Next, a detailed explanation will be given for a first example embodiment with reference to the drawings.

In the following description, the terms user, provider, first person, and second person are used, and definitions of these terms are, for example, as follows. The user refers to a user of a service. The number of users is one or more. The first person refers to any one of the users. The provider refers to a provider of a service. The number of providers is one or more. The second person refers to a person in charge of the first person among the providers.

First Example Embodiment (Configuration of Providing System 1000)

FIG. 1 is a diagram illustrating an example of a configuration of a providing system 1000 according to a first example embodiment. The providing system 1000 is a system for providing a service to a user. As illustrated in FIG. 1, the providing system 1000 includes a control device 100, a robot 200, an imaging device 300, a sensor 400, and a storage device 500.

Figure 2:
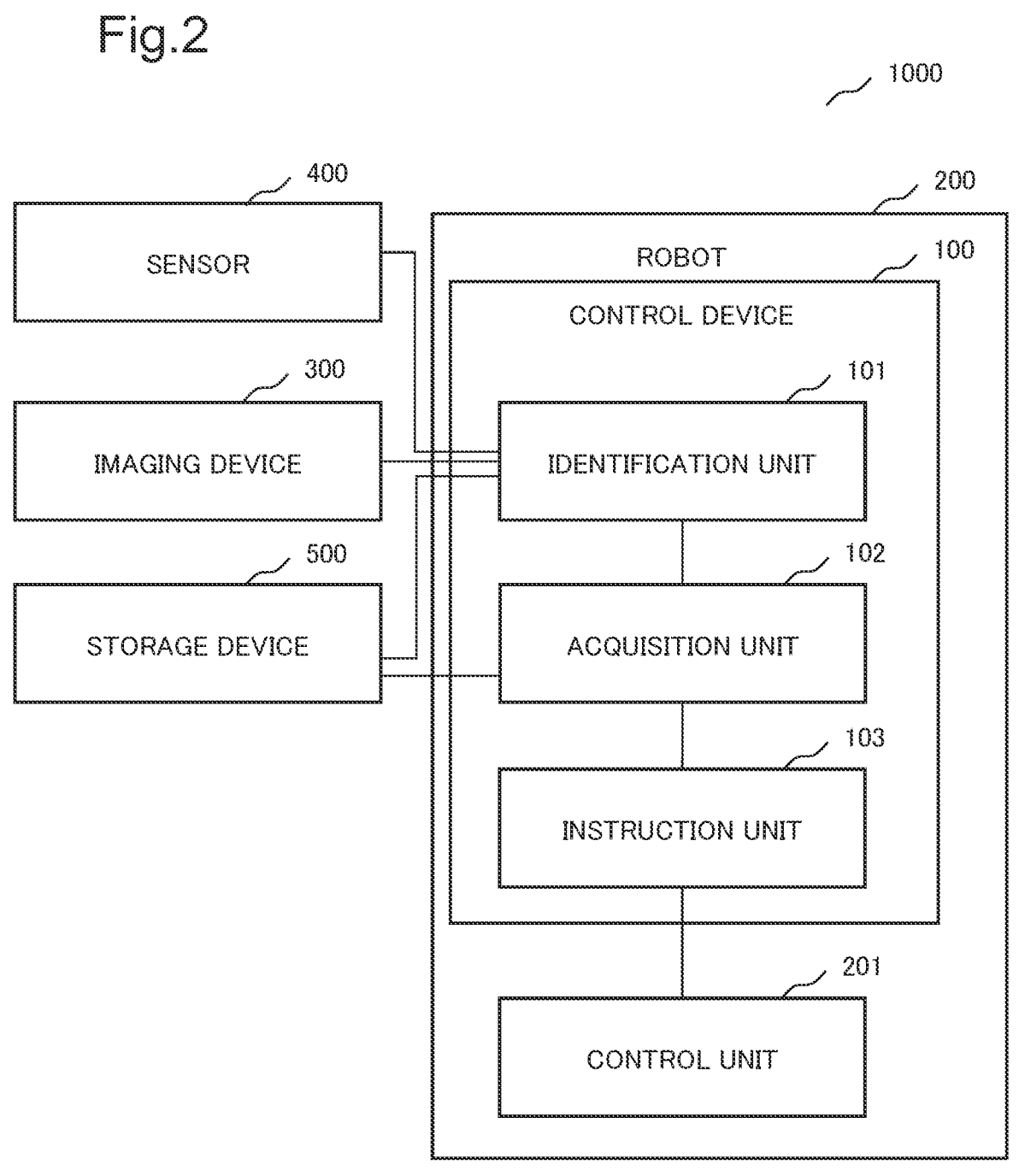

The control device 100 is a device for giving a control instruction to the robot 200. Therefore, the control device 100 is communicably connected to the robot 200. Alternatively, as illustrated in FIG. 2, the control device 100 may be a part of the configuration of the robot 200. The control device 100 is achieved by, for example, an information processing device such as a computer or a server. A specific configuration of the control device 100 will be described later.

The robot 200 is a device that provides a service to the first person based on an instruction from the control device 100. Specifically, the robot 200 is a device that provides a service to a user of a service based on an instruction from the control device 100. The robot 200 is, for example, a service robot that supports operations and tasks performed by humans. Such a service robot can be achieved by a humanoid robot, a robot hand, a robot arm, or a combination thereof. In addition, the robot is not limited thereto, and may be a device having one or more of various actuators for holding an object, moving an object, and moving itself. The robot 200 includes a control unit 201. The control unit 201 controls an operation of the robot 200 based on an instruction received from the control device 100. The control unit 201 is achieved by, for example, a computer circuit including a processor such as a central processing unit (CPU) and a memory.

The imaging device 300 is a device that images the first person. Specifically, the imaging device 300 images the user. The imaging device 300 is communicably connected to the control device 100. Information on an image captured by the imaging device 300 is transmitted to the control device 100 and used by the control device 100 for user identification processing, which will be described in detail below. In addition, at least one of the image captured by the imaging device 300 or the information acquired by the sensor 400 is used for the identification processing of the control device 100. Therefore, in a case where the sensor 400 is included in the configuration of the providing system 1000, the providing system 1000 may not include the imaging device 300. The imaging device 300 is installed, for example, at a position overlooking a space in which the robot 200 is disposed. Alternatively, the imaging device 300 may be installed in the robot 200. The imaging device 300 is not necessarily fixed to a building or the robot 200, and may be detachable or movable. Examples of such a portable camera include a drone equipped with a camera, a wearable camera, and the like.

The sensor 400 is a sensor for acquiring information about the first person. Specifically, the sensor 400 is achieved by a fingerprint sensor, a sound sensor (microphone), a distance sensor, or a combination thereof, and acquires user information. The above-described sensor is an example, and the sensor is not limited to the above-described example. Furthermore, the imaging device 300 may be used as the sensor 400, or an imaging device different from the imaging device 300 may be used as the sensor 400. The sensor 400 acquires one or both of the following kinds of information.

Physical feature (fingerprint or voiceprint) of user

Distance between robot 200 and user

The sensor 400 is communicably connected to the control device 100. The information on the physical feature of the user acquired by the sensor 400 is transmitted to the control device 100 and used by the control device 100 for user identification processing, which will be described in detail below. Furthermore, the information on the distance between the robot 200 and the user acquired by the sensor 400 is transmitted to the control device 100 and used for the control device 100 to control the robot 200.

As described above, at least one of the image captured by the imaging device 300 or the information acquired by the sensor 400 is used for the identification processing of the control device 100. Therefore, in a case where the imaging device 300 is included in the configuration of the providing system 1000, the providing system 1000 may not include the sensor 400. In addition, the sensor 400 is installed in, for example, the robot 200.

The storage device 500 holds information necessary for the processing of the control device 100. Specifically, the storage device 500 holds three kinds of information as follows.

Physical feature of first person

Person-in-charge information

Action model of second person

Specifically, the physical feature of the first person is biological information such as a face, a fingerprint, an iris, a retina, a voiceprint, or a vein of the user. The physical feature of the first person is used by the control device 100 to identify the user. The storage device 500 holds the physical feature of the user and the identification information of the user in association with each other. The identification information is information capable of specifying the person. Specifically, the identification information includes information such as name, age, and sex. The identification information may include information other than the information described above.

The person-in-charge information refers to information in which identification information of the first person is associated with identification information of the second person in charge of the first person. Specifically, the person-in-charge information refers to information in which the identification information of the user is associated with identification information of the provider in charge of the user. The information for identifying the provider is information capable of specifying the provider, and includes information such as name, age, and sex of the provider. The information for identifying the provider may include information other than the above-described information.

Specifically, the action model of the second person is a model generated using actions of the provider as teacher data. The action model of the provider is generated by a known machine learning method. The action model of the provider is generated, for example, by performing model learning using information in which data indicating a state of the user is associated with data regarding an action of the provider performed in the state of the user. That is, the action model of the provider includes a feature of an action of the provider with respect to the user. The storage device 500 holds information in which the action model of the provider is associated with the identification information of the provider.

(Configuration of Control Device 100)

Next, a configuration of the control device 100 will be described with reference to FIG. 3. FIG. 3 is a diagram illustrating an example of a configuration of the control device 100 according to the first example embodiment. As illustrated in FIG. 3, the control device 100 includes an identification unit 101, an acquisition unit 102, and an instruction unit 103.

The identification unit 101 identifies a first person. Specifically, the identification unit 101 identifies a user. The identification unit 101 identifies the user based on the physical feature of the user held in the storage device 500 and at least one of the image captured by the imaging device 300 and the information acquired by the sensor 400.

Specifically, the identification unit 101 identifies the user according to the following procedure. First, the identification unit 101 acquires at least one of an image captured by the imaging device 300 and information acquired by the sensor 400. In a case where the image captured by the imaging device 300 is received, the identification unit 101 extracts a physical feature of a user appearing in the image using a known image analyzing means. Specifically, the identification unit 101 extracts a feature amount of a face and a feature amount of an iris from the image. Then, the identification unit 101 identifies a user by collating at least one of the physical feature extracted from the image and the physical feature acquired from the sensor 400 with the physical feature of the user held by the storage device 500. At this time, the identification unit 101 specifies identification information of the user corresponding to the physical feature.

The acquisition unit 102 acquires information on a second person related to the first person. Specifically, the acquisition unit 102 acquires identification information of a provider in charge of the user identified by the identification unit 101.

Specifically, the acquisition unit 102 acquires information on a provider in charge of the user according to the following procedure. First, the acquisition unit 102 searches for person-in-charge information held in the storage device 500 using the identification information of the user specified by the identification unit 101. Then, the acquisition unit 102 acquires identification information of a provider in charge of the user.

The instruction unit 103 reads out an action with respect to the first person based on the information on the second person. Specifically, the instruction unit 103 reads out an action (action information) with respect to the user, that is, an action model of the provider in charge of the user, based on the identification information of the provider acquired by the acquisition unit 102. Specifically, the instruction unit 103 reads out an action model of the provider according to the following procedure. The instruction unit 103 searches for an action model of the provider held by the storage device 500 using the identification information of the provider acquired by the acquisition unit 102. Then, the instruction unit 103 reads out the action model of the provider. Further, the instruction unit 103 transmits the read-out action model to the robot 200.

(Operation of Control Device 100)

Next, an example of an operation of the control device 100 according to the first example embodiment will be described with reference to a flowchart of FIG. 4.

As an example, the control device 100 starts processing when the distance between the robot 200 and the user acquired by the sensor 400 becomes equal to or smaller than a predetermined threshold value. Alternatively, the control device 100 may start processing at the same time as the robot 200 is actuated, or may start processing at predetermined time intervals. Alternatively, the control device 100 may start processing upon receiving an instruction from the outside.

First, the identification unit 101 acquires at least one of an image captured by the imaging device 300 and information acquired by the sensor 400, and extracts a physical feature of the user. Next, the identification unit 101 identifies a user by collating the physical feature of the user with the physical feature of the user held by the storage device 500 (step S101). At this time, the identification unit 101 acquires identification information of the user from the storage device 500.

Next, the acquisition unit 102 searches for person-in-charge information held in the storage device 500 using the identification information of the user specified by the identification unit 101. Then, the acquisition unit 102 acquires identification information of a provider in charge of the user (step S102).

Next, the instruction unit 103 searches for an action model of the provider held by the storage device 500 using the identification information of the provider acquired by the acquisition unit 102. Then, the instruction unit 103 reads out the action model of the provider (step S103). The instruction unit 103 transmits the read-out action model to the robot 200, and ends the processing.

Effects

The control device 100 according to the first example embodiment is configured as described above. Next, effects of the first example embodiment will be described.

As described above, the control device 100 identifies a first person, acquires identification information on a second person in charge of the identified first person, and reads out an action with respect to the first person, that is, an action model of the second person in charge of the first person, based on the acquired identification information of the second person. In other words, the control device 100 according to the first example embodiment can read out the action model of the provider who is usually in charge of the user. The action model of the provider includes a feature of the action taken by the second person with respect to the first person. That is, the control device 100 according to the first example embodiment is capable of reducing discomfort felt by the user when the robot provides the service. In other words, the control device 100 according to the first example embodiment is capable of providing an optimized service for the user.

(Example of Application of Providing System 1000)

Next, a specific example in which the providing system 1000 is applied to an actual service will be described. In the present description, as an example, a specific example of application to a physicalcare service and a specific example of application to a customer service will be described. The services to which the providing system 1000 is applied are not limited to what have been described above, and may be applied to other services.

Specific Example 1: Application to Care Service

Figure 5:
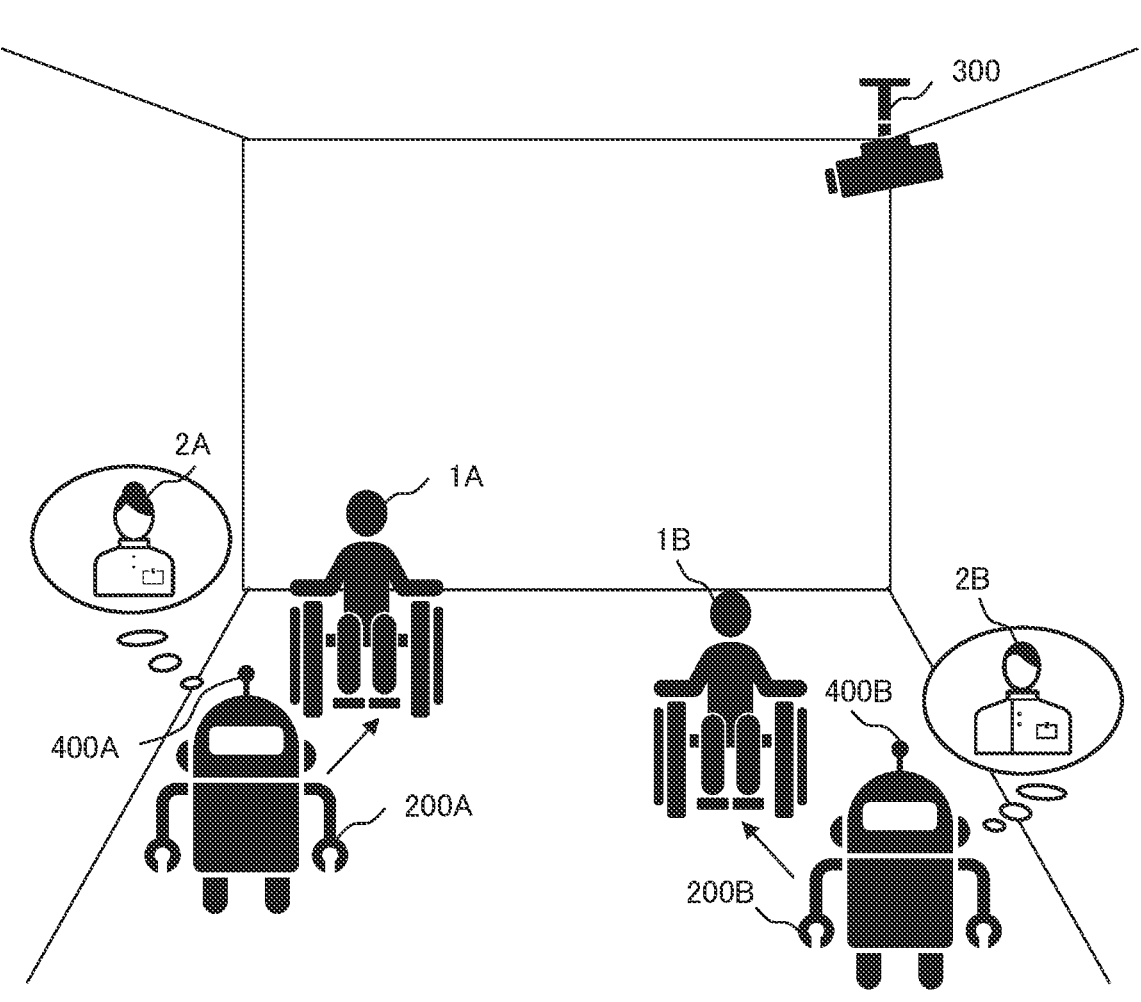
FIG. 5 is an image diagram in a case where the providing system 1000 according to the first example embodiment is applied to a physicalcare service.

FIG. 5 is an image diagram in a case where the providing system 1000 according to the first example embodiment is applied to a physicalcare service. In a case where the providing system 1000 is applied to a physicalcare service, the users are physicalcare receivers (1A and 1B) who receive the physicalcare service, and the providers are physicalcare givers (2A and 2B) who provide the physicalcare service. Although it is illustrated in FIG. 5 that the number of physicalcare receivers is two, the number of physicalcare receivers is not limited as long as it is one or more. In the following description, the physicalcare receiver 1A and the physicalcare receiver 1B will be referred to as a physicalcare receiver 1 when it is not particularly necessary to distinguish them from each other. Similarly, the physicalcare giver 2A and the physicalcare giver 2B will also be referred to as a physicalcare giver 2 when it is not particularly necessary to distinguish them from each other.

In specific example 1, the service provided by the robot 200 to the physicalcare receiver 1 is a physicalcare service. Specifically, the physicalcare service may be walking assistance, movement assistance from bed, meal assistance, or diaper change. The above-described physicalcare service provided by the robot 200 is an example, and is not limited to the above-described example.

The configuration of the providing system 1000 in specific example 1 is similar to the configuration described in the first example embodiment. That is, as illustrated in FIG. 1 or 2, the providing system 1000 includes a control device 100, a robot 200, an imaging device 300, a sensor 400, and a storage device 500.

The robot 200 is a device that provides the above-described physicalcare service to the physicalcare receiver 1. The robot 200 is achieved by a robot capable of providing the above-described physicalcare service. The robot 200 can be achieved by, for example, a care robot described in a reference document (JP 2010-052079 A), a walking assistance robot described in a reference document (JP 2022-000143 A), a robot that provides meal assistance, or a robot that changes a diaper. The above-described means for achieving the robot 200 is an example, and is not limited to the above-described example. The robot 200 may be any robot as long as it is capable of providing a physicalcare service. Although it is illustrated in FIG. 5 that the number of robots 200 is two (200A and 200B), the number of robots is not limited as long as it is one or more.

The imaging device 300 is a device that images the physicalcare receiver 1. As illustrated in FIG. 5, the imaging device 300 is installed, for example, at a position overlooking a space in which the robot 200 is disposed. Alternatively, the imaging device 300 may be a part of the configuration of the robot 200. In addition, as described above, the providing system 1000 may not include either the imaging device 300 or the sensor 400. Therefore, as illustrated in FIG. 5, in a case where the providing system 1000 includes sensors (400A and 400B), the imaging device 300 may not be included in the configuration. Although it is illustrated in FIG. 5 that the number of imaging devices 300 is one, a plurality of imaging devices 300 may be provided.

The sensor 400 acquires at least one of a physical feature (a fingerprint or a voiceprint) of the physicalcare receiver 1 and a distance between the robot 200 and the physicalcare receiver 1. The sensor 400 is installed in, for example, the robot 200 as illustrated in FIG. 5. Furthermore, in a case where the imaging device 300 is included in the providing system 1000 as illustrated in FIG. 5, the sensor 400 may not be included in the configuration. Although it is illustrated in FIG. 5 that the number of sensors 400 is two, the number of sensors 400 is not limited.

The storage device 500 holds information necessary for the processing of the control device 100. As described above, the storage device 500 holds three kinds of information as follows.

Physical feature of physicalcare receiver 1

Person-in-charge information

Action model of physicalcare giver 2

The person-in-charge information refers to information in which identification information of the physicalcare receiver 1 is associated with identification information of the physicalcare giver 2 in charge of the physicalcare receiver 1. For example, it is assumed that the physicalcare giver 2A is in charge of the physicalcare receiver 1A and the physicalcare giver 2B is in charge of the physicalcare receiver 1B. In this case, the person-in-charge information includes information in which identification information of the physicalcare receiver 1A is associated with identification information of the physicalcare giver 2A, and information in which identification information of the physicalcare receiver 1B is associated with the identification information of the physicalcare giver 2B. The person-in-charge information is generated based on, for example, information acquired from a database held by a care facility, and is held in the storage device 500.

The action model of the physicalcare giver 2 refers to a model generated using, as teacher data, information in which data indicating a state of the physicalcare receiver 1 is associated with data regarding an action of the physicalcare giver 2 performed in the state of the physicalcare receiver 1.

The data regarding the action of the physicalcare giver 2 includes, for example, the following data. For example, in a case where the robot 200 is a robot that performs walking assistance or movement assistance, the data regarding the action of the physicalcare giver 2 includes a position at which the physicalcare giver 2 grips the physicalcare receiver 1, a strength of a force applied to the physicalcare receiver 1 when gripping the physicalcare receiver 1, a speed at which the physicalcare giver 2 moves the physicalcare receiver 1, a timing at which the physicalcare giver 2 talks to the physicalcare receiver 1, and what the physicalcare giver 2 talks to the physicalcare receiver 1 about. For example, in a case where the robot 200 is a robot that performs meal assistance, the data regarding the action of the physicalcare giver 2 includes an order in which the physicalcare giver 2 conveys the meal to the mouth of the physicalcare receiver 1, a speed at which the physicalcare giver 2 conveys the meal to the mouth of the physicalcare receiver 1, an angle at which the physicalcare giver 2 conveys the meal to the mouth of the physicalcare receiver 1, a timing at which the physicalcare giver 2 talks to the physicalcare receiver 1, and what the physicalcare giver 2 talks to the physicalcare receiver 1 about. For example, in a case where the robot 200 is a robot that changes a diaper, the data regarding the action of the physicalcare giver 2 includes a timing at which the physicalcare giver 2 talks to the physicalcare receiver 1, and what the physicalcare giver 2 talks to the physicalcare receiver 1 about. The above-described data regarding the action of the physicalcare giver 2 is an example, and is not limited to the above-described example.

The action model of the physicalcare giver 2 is generated, for example, by the control device 100 performing model learning through machine learning using information in which data indicating a state of the physicalcare receiver 1 is associated with the above-described data regarding the action of the physicalcare giver 2 performed in the state of the physicalcare receiver 1. The action model generated by the control device 100 is stored in the storage device 500. Specifically, the storage device 500 holds information in which the action model of the physicalcare giver 2 is associated with the identification information of the physicalcare giver 2.

The control device 100 is a device for giving a control instruction to the robot 200. The configuration of the control device 100 in specific example 1 is similar to the configuration described in the first example embodiment. That is, as illustrated in FIG. 3, the control device 100 includes an identification unit 101, an acquisition unit 102, and an instruction unit 103.

The identification unit 101 identifies a physicalcare receiver 1. Specifically, the identification unit 101 identifies the physicalcare receiver 1 based on the physical feature of the physicalcare receiver 1 held in the storage device 500 and at least one of the image captured by the imaging device 300 and the information acquired by the sensor 400.

The acquisition unit 102 acquires identification information of a physicalcare giver 2 in charge of the physicalcare receiver 1 identified by the identification unit 101.

The instruction unit 103 reads out an action with respect to the physicalcare receiver 1, that is, an action model of the physicalcare giver 2, based on the identification information of the physicalcare giver 2 acquired by the acquisition unit 102.

Since the operation of the control device 100 is similar to the operation described with reference to FIG. 4 in the first example embodiment, the description thereof will be omitted here.

The control device 100 in specific example 1 is configured as described above. Next, effects of specific example 1 will be described.

At a physicalcare service site, in many cases, the physicalcare giver 2 in charge of caring for the physicalcare receiver 1 is determined in advance. In addition, what physicalcare service is provided by the physicalcare giver 2 varies from person to person. For example, in a case where the physicalcare service is walking assistance or movement assistance, a position at which the physicalcare giver 2 grips the physicalcare receiver 1, a strength of a force applied to the physicalcare receiver 1 when gripping the physicalcare receiver 1, a speed at which the physicalcare giver 2 moves the physicalcare receiver 1, a timing at which the physicalcare giver 2 talks to the physicalcare receiver 1, and what the physicalcare giver 2 talks to the physicalcare receiver 1 about vary depending on who the physicalcare giver 2 is. For example, in a case where the physicalcare service is meal assistance, an order in which the physicalcare giver 2 conveys the meal to the mouth of the physicalcare receiver 1, a speed at which the physicalcare giver 2 conveys the meal to the mouth of the physicalcare receiver 1, an angle at which the physicalcare giver 2 conveys the meal to the mouth of the physicalcare receiver 1, a timing at which the physicalcare giver 2 talks to the physicalcare receiver 1, and what the physicalcare giver 2 talks to the physicalcare receiver 1 about vary depending on who the physicalcare giver 2 is. For example, in a case where the physicalcare service is diaper change, a timing at which the physicalcare giver 2 talks to the physicalcare receiver 1 and what the physicalcare giver 2 talks to the physicalcare receiver 1 about vary depending on who the physicalcare giver 2 is. In a case where a robot is introduced to a physicalcare service site, since a service provided by the robot is different from a service normally received by the physicalcare receiver 1, there is a possibility that the user feels uncomfortable about the service provided by the robot.

In this regard, the control device 100 in specific example 1 includes an identification unit 101 that identifies a physicalcare receiver 1, an acquisition unit 102 that acquires identification information of a physicalcare giver 2 in charge of the physicalcare receiver 1 identified by the identification unit 101, and an instruction unit 103 that reads out an action with respect to the physicalcare receiver 1, that is, an action model of the physicalcare giver 2, based on the identification information of the physicalcare giver 2 acquired by the acquisition unit 102. The action model of the physicalcare giver 2 to be read out is a model generated using, as teacher data, information in which data indicating a state of the physicalcare receiver 1 is associated with data regarding an action of the physicalcare giver 2 performed in the state of the physicalcare receiver 1. Therefore, the control device 100 in specific example 1 is capable of reducing the sense of discomfort felt by the physicalcare receiver 1 when the robot provides the service.

Specific Example 2: Application to Customer Service

Figure 6:
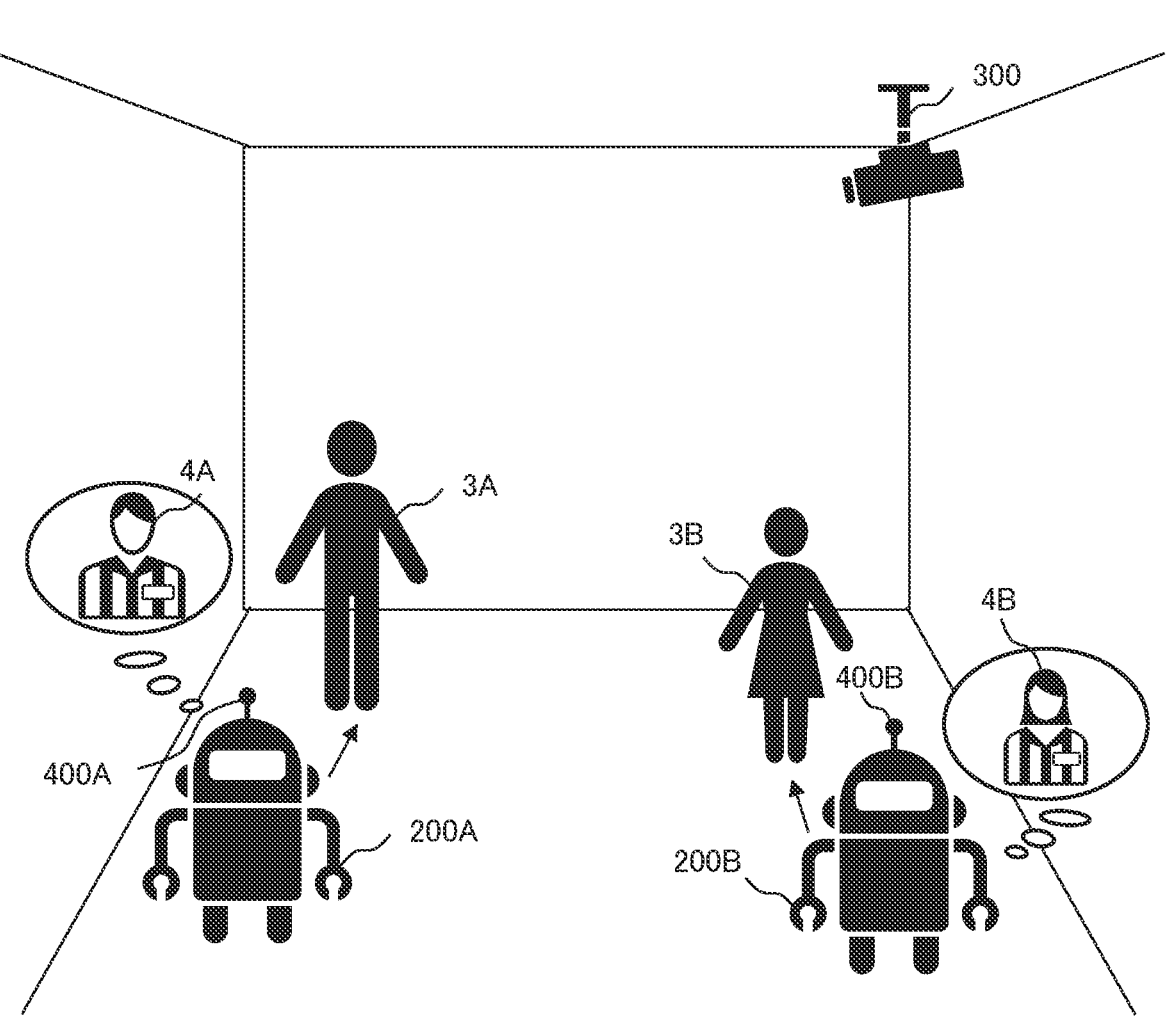
FIG. 6 is an image diagram in a case where the providing system 1000 according to the first example embodiment is applied to a customer service.

FIG. 6 is an image diagram in a case where the providing system 1000 according to the first example embodiment is applied to a customer service. In a case where the providing system 1000 is applied to a customer service, the users are customers (3A and 3B) who receive the customer service, and the providers are store clerks (4A and 4B) who provide the customer service. Although it is illustrated in FIG. 6 that the number of customers is two, the number of customers is not limited as long as it is one or more. In the following description, the customer 3A and the customer 3B will be referred to as a customer 3 when it is not particularly necessary to distinguish them from each other. Similarly, the store clerk 4A and the store clerk 4B will also be referred to as a store clerk 4 when it is not particularly necessary to distinguish them from each other.

In specific example 2, the service provided by the robot 200 to the customer 3 is a customer service. Specifically, the customer service may be product explanation, guidance, or talking to the customer 3. The above-described customer service provided by the robot 200 is an example, and is not limited to the above-described example.

The configuration of the providing system 1000 in specific example 2 is similar to the configuration described in the first example embodiment. That is, as illustrated in FIG. 1 or 2, the providing system 1000 includes a control device 100, a robot 200, an imaging device 300, a sensor 400, and a storage device 500.

The robot 200 is a device that provides the above-described customer service to the customer 3. The robot 200 is achieved by a robot capable of providing the above-described customer service. The robot 200 can be achieved by, for example, a customer service robot described in a reference document (JP 2019-032778 A). The above-described means for achieving the robot 200 is an example, and is not limited to the above-described example. The robot 200 may be any robot as long as it is capable of providing a customer service. Although it is illustrated in FIG. 6 that the number of robots 200 is two (200A and 200B), the number of robots is not limited as long as it is one or more.

The imaging device 300 is a device that images the customer 3. The sensor 400 acquires at least one of a physical feature (a fingerprint or a voiceprint) of the customer 3 or a distance between the robot 200 and the customer 3. The details of the imaging device 300 and the sensor 400 are similar to those in specific example 1, and thus, the description thereof will be omitted here.

The storage device 500 holds information necessary for the processing of the control device 100. As described above, the storage device 500 holds three kinds of information as follows.

Physical feature of customer 3

Person-in-charge information

Action model of store clerk 4

The person-in-charge information refers to information in which identification information of the customer 3 is associated with identification information of the store clerk 4 in charge of the customer 3. For example, it is assumed that the store clerk 4A is in charge of the customer 3A and the store clerk 4B is in charge of the customer 3B. In this case, the person-in-charge information includes information in which identification information of the customer 3A is associated with identification information of the store clerk 4A, and information in which identification information of the customer 3B is associated with identification information of the store clerk 4B. The person-in-charge information is generated based on, for example, information acquired from a database held by a store, and is held in the storage device 500.

The action model of the store clerk 4 refers to a model generated using, as teacher data, information in which data indicating a state of the customer 3 is associated with data regarding an action of the store clerk 4 performed in the state of the customer 3.

The data regarding the action of the store clerk 4 includes, for example, the following data. For example, in a case where the robot 200 is a robot that performs product explanation, the data regarding the action of the store clerk 4 includes what the store clerk 4 explains to the customer 3, what a question to the customer 3 during the explanation is, a timing at which the store clerk 4 asks the question to the customer 3, and how the store clerk 4 respond to an answer from the customer 3. For example, in a case where the robot 200 is a robot that performs guidance, the data regarding the action of the store clerk 4 includes what the guidance performed by the store clerk 4 is and how the store clerk 4 respond to a question from the customer 3. For example, when the robot 200 is a robot that talks to the customer 3, the data regarding the action of the store clerk 4 includes a timing at which the store clerk 4 talks to the customer 3 and what the store clerk 4 talks to the customer 3 about. The above-described data regarding the action of the store clerk 4 is an example, and is not limited to the above-described example.

The action model of the store clerk 4 is generated, for example, by performing model learning using information in which data indicating a state of the customer 3 is associated with the above-described data regarding the action of the store clerk 4 performed in the state of the customer 3. The storage device 500 holds information in which the action model of store clerk 4 is associated with identification information of store clerk 4.

The control device 100 is a device for giving a control instruction to the robot 200. The configuration of the control device 100 in specific example 2 is similar to the configuration described in the first example embodiment. That is, as illustrated in FIG. 3, the control device 100 includes an identification unit 101, an acquisition unit 102, and an instruction unit 103.

The identification unit 101 identifies a customer 3. Specifically, the identification unit 101 identifies the customer 3 based on the physical feature of the customer 3 held in the storage device 500 and at least one of the image captured by the imaging device 300 and the information acquired by the sensor 400.

The acquisition unit 102 acquires identification information of a store clerk 4 in charge of the customer 3 identified by the identification unit 101.

The instruction unit 103 reads out an action with respect to the customer 3, that is, an action model of the store clerk 4, based on the identification information of the store clerk 4 acquired by the acquisition unit 102.

Since the operation of the control device 100 is similar to the operation described with reference to FIG. 4 in the first example embodiment, the description thereof will be omitted here.

The control device 100 in specific example 2 is configured as described above. Next, effects of specific example 2 will be described.

At a customer service site, in a case where the customer 3 is a regular customer, the store clerk 4 in charge of serving the customer 3 may be determined in advance. In addition, what customer service is provided by the store clerk 4 varies from person to person. For example, in a case where the customer service is product explanation, what the store clerk 4 explains to the customer 3, what a question to the customer 3 during the explanation is, a timing at which the store clerk 4 asks the question to the customer 3, and how the store clerk 4 respond to an answer from the customer 3 vary depending on who the store clerk 4 is. For example, in a case where the customer service is guidance, what the guidance performed by the store clerk 4 is and how the store clerk 4 respond to a question from the customer 3 vary depending on who the store clerk 4 is. For example, in a case where the customer service is talking to the customer 3, a timing at which the store clerk 4 talks to the customer 3 and what the store clerk 4 talks to the customer 3 about vary depending on who the store clerk 4 is. Therefore, in a case where a robot is introduced to a customer service site, since a service provided by the robot is different from a service usually received by the customer 3 who is a regular customer, the customer 3 who is a regular customer may feel uncomfortable about the service provided by the robot.

In this regard, the control device 100 in specific example 2 includes an identification unit 101 that identifies a customer 3, an acquisition unit 102 that acquires identification information of a store clerk 4 in charge of the customer 3 identified by the identification unit 101, and an instruction unit 103 that reads out an action with respect to the customer 3, that is, an action model of the store clerk 4, based on the identification information of the store clerk 4 acquired by the acquisition unit 102. The action model of the store clerk 4 to be read out is a model generated using, as teacher data, information in which data indicating a state of the customer 3 is associated with data regarding an action of the store clerk 4 performed in the state of the customer 3. Therefore, the control device 100 in specific example 2 is capable of reducing the sense of discomfort felt by the customer 3 who is a regular customer when the robot provides the service.

Second Example Embodiment

Hereinafter, a second example embodiment according to the present disclosure will be described. A providing system 1000 according to the second example embodiment can be applied to, for example, a physicalcare service or a customer service as described in the example of application of the first example embodiment. In the description of the second example embodiment, the same components as those of the first example embodiment will be denoted by the same reference signs, and the detailed description thereof will be omitted.

(Configuration of Providing System 1000)

Figure 7:
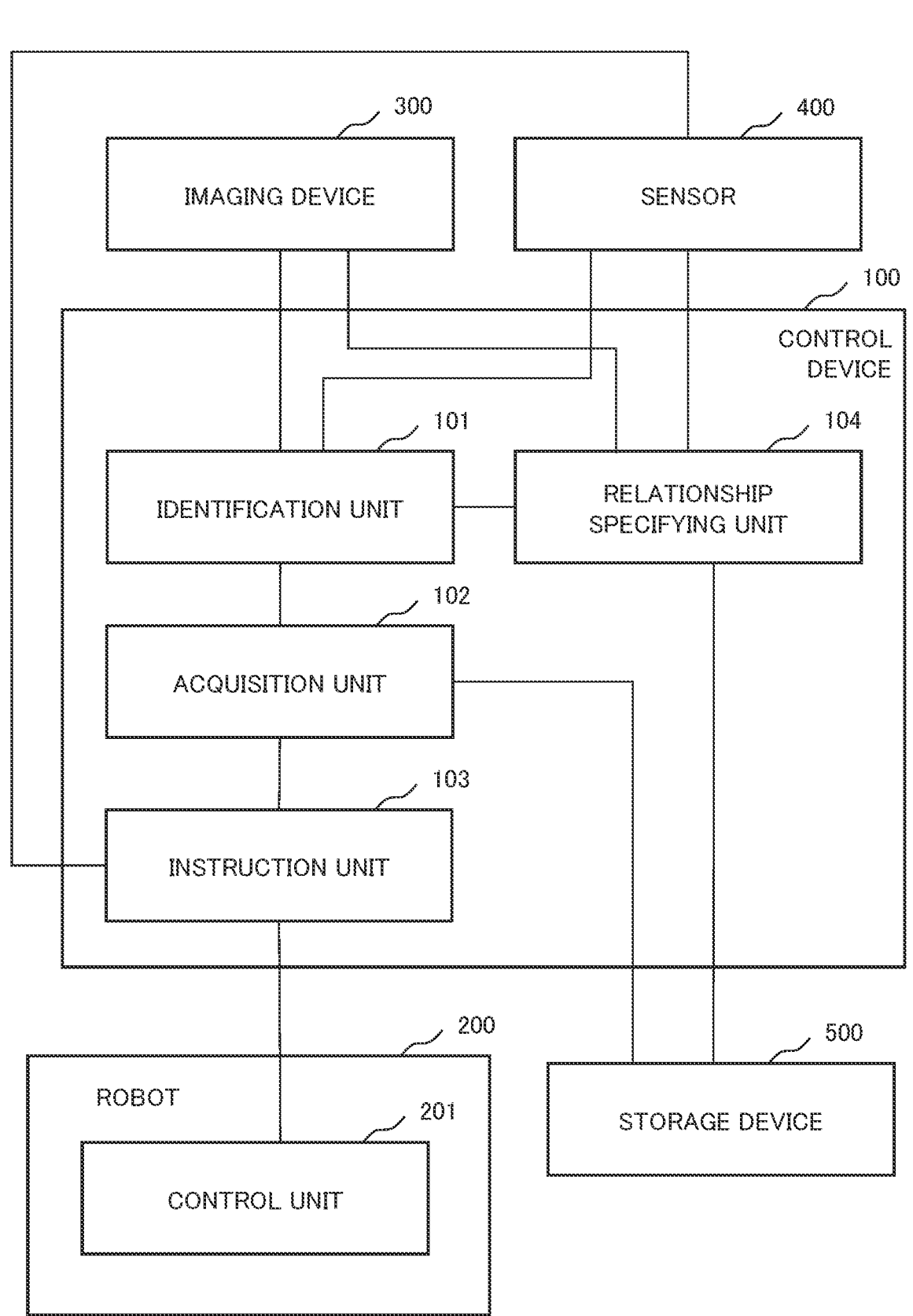
FIG. 7 is a diagram illustrating an example of a configuration of a providing system 1000 according to a second example embodiment.

FIG. 7 is a diagram illustrating an example of a configuration of the providing system 1000 according to the second example embodiment. As illustrated in FIG. 7, the providing system 1000 includes a control device 100, a robot 200, an imaging device 300, a sensor 400, and a storage device 500. The details of the robot 200 are similar to those described in the first example embodiment, and thus, the description thereof will be omitted here.

The imaging device 300 is a device that images a first person and a second person. Specifically, the imaging device 300 images a user and a provider. The imaging device 300 is installed at a position where a space to which the present providing system is applied can be entirely viewed from above. The number of imaging devices 300 may be one or more. Information on an image captured by the imaging device 300 is transmitted to the control device 100 and used for the following processing, which will be described in detail below.

Processing of identifying first person by identification unit 101

Processing of generating person-in-charge information by relationship specifying unit 104

The sensor 400 includes a sensor that acquires information on a first person and a sensor that acquires information on a second person. The information on the first person and the information on the second person may be acquired from one sensor. Specifically, the sensor 400 is achieved by a fingerprint sensor, a sound sensor (microphone), a distance sensor, a position sensor, an orientation sensor, or a combination thereof, and acquires information on the user and the provider. The sensor 400 may be installed in the robot 200 as illustrated in the first example embodiment, or the information on the user and the provider may be acquired by devices carried by the user and the provider. The devices carried by the user and the provider are achieved by, for example, smartphones, tablet terminals, or wearable terminals.

The sensor 400 acquires one or both of the following kinds of information to be used by the identification unit 101 for processing of identifying a user.

Physical feature (fingerprint or voiceprint) of user

Distance between robot 200 and user

In addition, the sensor 400 acquires one or more of the following kinds of information to be used by the relationship specifying unit 104 for processing of generating person-in-charge information.

Physical features of user and provider

Distance between user and provider position information of user and provider

Conversation information of user and provider

The storage device 500 holds information necessary for the processing of the control device 100. Specifically, the storage device 500 holds five kinds of information as follows. Note that, among the following information, the physical feature of the user and the action model of the provider are similar to those described in the first example embodiment, and thus, the detailed description thereof will be omitted.

Physical feature of user

Action model of provider

Person-in-charge information physical feature of provider

Typical utterance of the provider

The person-in-charge information refers to information in which identification information of the user is associated with identification information of the provider in charge of the user. The person-in-charge information is generated by the relationship specifying unit 104 and held in the storage device 500. The details of the processing of generating person-in-charge information by the relationship specifying unit 104 will be described later.

Specifically, the physical feature of the provider refers to biological information such as a face, a fingerprint, an iris, a retina, a voiceprint, or a vein of the person in charge. The physical feature of the person in charge is used by the control device 100 to identify the person in charge. The storage device 500 holds the physical feature of the person in charge and the identification information of the person in charge in association with each other.

The typical utterance of the provider refers to a typical utterance of the provider determined for each service. For example, the typical utterance of the provider refers to an utterance to talk to the user before providing the service, an utterance to confirm whether the service is good or bad for the user, an utterance to confirm the preference of the user, and the like. The above-described typical utterance of the provider is an example, and is not limited to the above-described example. The typical utterance of the provider is used by the relationship specifying unit 104 to generate person-in-charge information.

(Configuration of Control Device 100)

The control device 100 is a device for giving a control instruction to the robot 200. As illustrated in FIG. 7, the control device 100 includes an identification unit 101, an acquisition unit 102, an instruction unit 103, and a relationship specifying unit 104. The details of the identification unit 101, the acquisition unit 102, and the instruction unit 103 are similar to those in the first example embodiment, and thus, the description thereof will be omitted here.

The relationship specifying unit 104 specifies a person in charge of the first person as the second person. Specifically, the relationship specifying unit 104 specifies a person in charge of the user from among a plurality of providers. The relationship specifying unit 104 estimates a person in charge of the first person who is the user, by using at least one of a distance between the persons, a time when the distance between the persons is equal to or smaller than a predetermined threshold value, conversation information between the persons, an action relationship between the persons, and attribute information of the persons, and specifies the estimated person in charge as the second person. The relationship specifying unit 104 specifies a person in charge of the user according to the following procedure.

First, the identification unit 101 and the relationship specifying unit 104 receive at least one of an image captured by the imaging device 300 and information acquired by the sensor 400.

Next, the identification unit 101 identifies a user from the image captured by the imaging device 300 or the information acquired by the sensor 400 according to the procedure described in the first example embodiment.

Next, the relationship specifying unit 104 specifies a provider in charge of the user according to the following procedure.

In a case where an image is received from the imaging device 300, the relationship specifying unit 104 calculates distances between persons appearing in the image. Then, the relationship specifying unit 104 specifies a person whose distance from the user identified by the identification unit 101 is equal to or smaller than the predetermined threshold value as the person in charge of the user. The relationship specifying unit 104 extracts a physical feature of the specified person in charge using a known image analyzing means. Specifically, the relationship specifying unit 104 extracts a feature amount of a face and a feature amount of an iris from the image. Then, the relationship specifying unit 104 specifies a provider in charge of the user with reference to the physical feature of the provider held in the storage device 500.

In a case where physical features of a user and a provider are received from the sensor 400, the relationship specifying unit 104 specifies the user and the provider in charge of the user with reference to the physical feature of the user and the physical feature of the provider held in the storage device 500.

In a case where distances between users and providers are received from the sensor 400, the relationship specifying unit 104 specifies a person whose distance from the user identified by the identification unit 101 is equal to or smaller than the predetermined threshold value as the provider in charge of the user. In a case where position information of users and providers is received from the sensor 400, the relationship specifying unit 104 calculates a distance between the user and another person based on the position information and the information on the user identified by the identification unit 101. Then, the relationship specifying unit 104 specifies a person whose distance from the user is equal to or smaller than the predetermined threshold value as the provider in charge of the user.

Alternatively, the relationship specifying unit 104 may specify a person in charge who has been detected together with the user for a time equal to or greater than a threshold value as the provider in charge of the user. As a condition for specifying that the person in charge is detected together with the user, for example, a condition that a distance between the user and the person in charge is equal to or greater than the predetermined threshold value may be included.

Alternatively, in a case where conversation information of the provider is received from the sensor 400, the relationship specifying unit 104 specifies an utterance of the provider through known voice recognition processing. Then, the relationship specifying unit 104 specifies the provider in charge of the user with reference to the typical utterance of the provider held in the storage device 500. Specifically, when the utterance of the provider specified through the voice recognition processing coincides with the typical utterance of the provider stored in the storage device 500, the relationship specifying unit 104 specifies the provider as the person in charge of the user.

Next, the relationship specifying unit 104 generates person-in-charge information based on the identification information of the user identified by the identification unit 101 and the identification information of the provider in charge of the user. Then, the relationship specifying unit 104 stores the generated person-in-charge information in the storage device 500.

(Operation of Control Device 100)

Next, an example of an operation of the control device 100 according to the second example embodiment will be described.

The control device 100 according to the second example embodiment performs an operation related to generation of person-in-charge information as preprocessing. Specifically, the preprocessing is a process of model learning for generating action data to be stored in the storage device 500 or processing performed immediately before the model learning. In addition, the preprocessing may not be performed at a timing during the model learning processing as long as it is performed at a timing earlier than an operation for giving a control instruction to the robot 200. Thereafter, the operation for giving a control instruction to the robot 200 is performed. Since the operation for giving a control instruction to the robot 200 is similar to the processing in steps S101 to S103 in the first example embodiment, the description thereof will be omitted.

Figure 8:
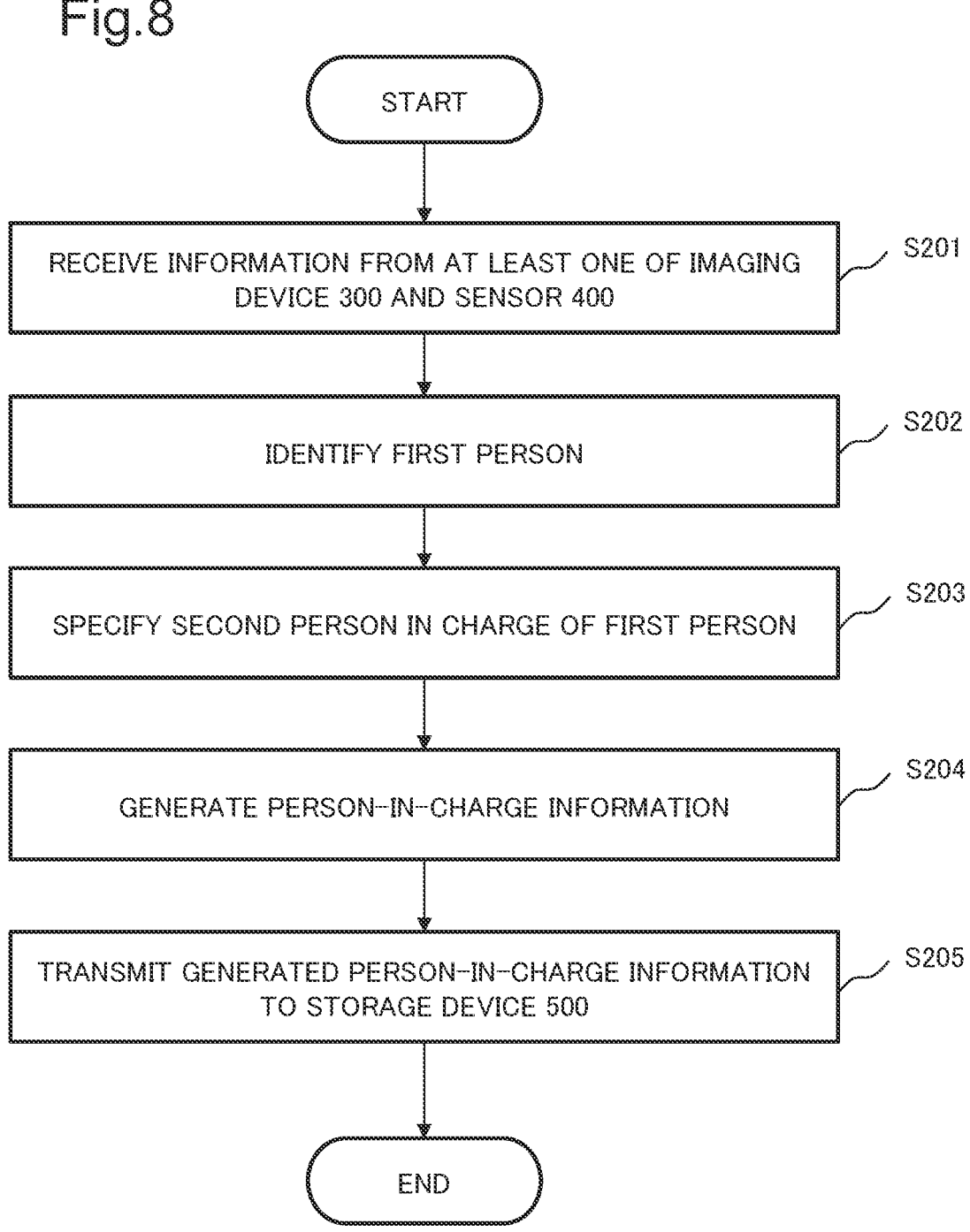
FIG. 8 is a flowchart illustrating an example of an operation of preprocessing of a control device 100 according to the second example embodiment.

FIG. 8 is a flowchart illustrating an example of an operation of preprocessing of the control device 100 according to the second example embodiment. The preprocessing of the control device 100 according to the second example embodiment will be described with reference to FIG. 8.

First, the identification unit 101 and the relationship specifying unit 104 receive information from at least one of the imaging device 300 and the sensor 400 (step S201). The identification unit 101 acquires at least one of an image captured by the imaging device 300 and information acquired by the sensor 400. The relationship specifying unit 104 receives an image from the imaging device 300. The relationship specifying unit 104 also receives, for example, the following information from the sensor 400.

Physical features of user and provider

Distance between user and provider position information of user and provider

Conversation information of user and provider

Next, the identification unit 101 identifies a first person according to the procedure described in step S101 (step S202).

Next, the relationship specifying unit 104 specifies a second person in charge of the first person based on the information received in step S201 and the information of the user identified in step S202 (step S203).

Next, the relationship specifying unit 104 generates person-in-charge information based on the information specified in step S203 (step S204).

Next, the relationship specifying unit 104 transmits the generated person-in-charge information to the storage device 500 (step S205). When the series of steps described above is completed, the control device 100 ends the operation of preprocessing.

Effects

The control device 100 according to the second example embodiment is configured as described above. Next, effects of the second example embodiment will be described. The control device 100 according to the second example embodiment can obtain the following effects in addition to the effects of the first example embodiment.

The control device 100 according to the second example embodiment includes a relationship specifying unit 104 that specifies a person in charge of the first person as the second person when the identification unit 101 identifies the first person. As a result, the second person related to the person in charge of the first person can be automatically specified. For example, at a physicalcare service site, a relationship between a physicalcare giver and a physicalcare receiver can be automatically generated. In addition, the control device 100 according to the second example embodiment is capable of generating person-in-charge information in the process of executing model learning or immediately before the course of executing model learning without performing a manual operation, and store the person-in-charge information in association with action data in the storage device 500 in the process of executing machine learning.

Modification

The control device 100 according to the second example embodiment may be modified as follows.

In the second example embodiment, the relationship specifying unit 104 is a part of the configuration of the control device 100, but is not limited to this configuration. For example, the relationship specifying unit 104 may be generated by an independent computer device.

Third Example Embodiment

Hereinafter, a third example embodiment according to the present disclosure will be described. A providing system 1000 according to the third example embodiment can be applied to, for example, a physicalcare service or a customer service as described in the example of application of the first example embodiment. In the description of the third example embodiment, the same components as those of the first example embodiment or the second example embodiment will be denoted by the same reference signs, and the detailed description thereof will be omitted.
(Configuration of Providing System 1000)

Figure 9:
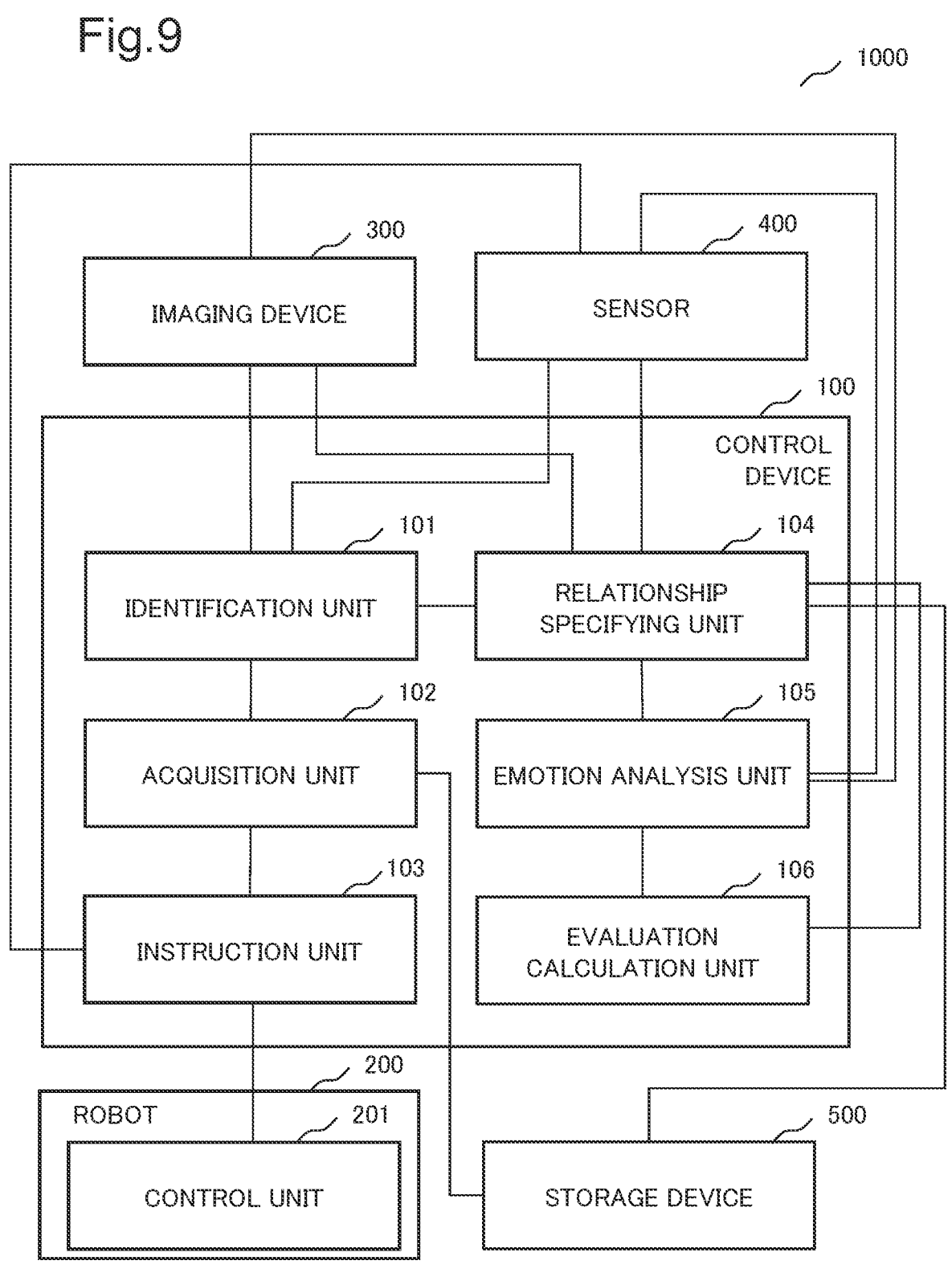
FIG. 9 is a diagram illustrating an example of a configuration of a providing system 1000 according to a third example embodiment.

FIG. 9 is a diagram illustrating an example of a configuration of the providing system 1000 according to the third example embodiment. As illustrated in FIG. 9, the providing system 1000 includes a control device 100, a robot 200, an imaging device 300, a sensor 400, and a storage device 500. The details of the robot 200, the imaging device 300, and the storage device 500 are similar to those described in the second example embodiment, and thus, the description thereof will be omitted here.

In the preprocessing described above, the sensor 400 acquires the following information in addition to the information described in the second example embodiment. The sensor 400 acquires, for example, the following information in the preprocessing in order to use the information during processing performed by an emotion analysis unit 105.

Physiological data of user

Voice information of user

The physiological data of the user refers to, for example, a heart rate, a blood pressure, a body temperature, a perspiration amount, and brain waves of the user. Therefore, the sensor 400 is achieved by, for example, a wearable terminal. The method of achieving the sensor 400 is an example, and is not limited to the above-described method.
(Configuration of Control Device 100)

The control device 100 includes an identification unit 101, an acquisition unit 102, an instruction unit 103, a relationship specifying unit 104, an emotion analysis unit 105, and an evaluation calculation unit 106. The details of the identification unit 101, the acquisition unit 102, and the instruction unit 103 are similar to those described in the second example embodiment, and thus, the description thereof will be omitted here.

The relationship specifying unit 104 specifies second persons in charge of the first person according to the procedure described in the second example embodiment. Then, the relationship specifying unit 104 selects a person of which an evaluation by the first person is equal to or greater than a predetermined threshold value from among the specified second persons. The relationship specifying unit 104 updates the person-in-charge information with the selected second person as the person in charge of the first person, and transmits the updated person-in-charge information to the storage device 500. In a case where there are a plurality of persons of which evaluations by the first person are equal to or greater than the predetermined threshold value, a second person of which an evaluation is highest may be specified. In addition, the present invention is not limited thereto, and a second person who is in charge of the first person on the latest date may be specified from among the second persons who have received evaluations equal to or greater than the threshold value.

The evaluations by the first person to be used for the processing of the relationship specifying unit 104 are calculated by the evaluation calculation unit 106. The processing of the evaluation calculation unit 106 will be described in detail later. For example, the evaluation calculation unit 106 generates information in which person-in-charge information and evaluation scores are associated with each other as illustrated in FIG. 10. The relationship specifying unit 104 selects a person of which an evaluation score is equal to or greater than a predetermined threshold value, from among the second persons, with reference to the information generated by the evaluation calculation unit 106. Alternatively, the relationship specifying unit 104 may select a person of which a classification value is a predetermined value with reference to the information generated by the evaluation calculation unit 106. For example, the relationship specifying unit 104 may select a person whose emotion is classified into "relaxed" or "happy", and may not select a person whose emotion is classified into "angry" or "sad". The classification of the emotion will be described in detail later.

The emotion analysis unit 105 estimates an emotion of the first person. The emotion analysis unit is communicably connected to the imaging device 300 and the sensor 400. The emotion analysis unit 105 analyzes a user's emotion based on an image captured by the imaging device 300 or information acquired by the sensor 400. The user's emotion is classified based on, for example, a Russell's circumplex model. The Russell's circumplex model is a circumplex model arranged two-dimensionally with a horizontal axis representing valence and a vertical axis representing arousal. In the Russell's circumplex model, a first quadrant is classified into a happy emotion, a second quadrant is classified into an angry emotion, a third quadrant is classified into a sad emotion, and a fourth quadrant is classified into a relaxed emotion.

The emotion analysis unit 105 performs user's emotion analysis according to, for example, the following procedure. The following procedure is an example, and the emotion analysis procedure is not limited to the following procedure.

In a case where an image is received from the imaging device 300, the emotion analysis unit 105 detects a user's face area using a known image analyzing means. Then, the emotion analysis unit 105 estimates a user's emotion using, for example, an expression evaluation model prepared in advance. The expression evaluation model is a trained model that has learned information in which an expression of the person is associated with an emotion of the person as teacher data. The expression evaluation model is a model to which an image of a face area is input, and from which an arousal estimation value and a valence estimation value, which are indices indicating an emotion of a person appearing in the image, are output.

In a case where physiological data of the user is received from the sensor 400, the emotion analysis unit 105 estimates a user's emotion using a known emotion analysis method. The emotion analysis unit 105 estimates a user's emotion using, for example, a physiological data evaluation model prepared in advance. The physiological data evaluation model is a trained model that has learned information in which physiological data of the person is associated with an emotion of the person as teacher data. The physiological data evaluation model is a model to which physiological data of a person is input, and from which an arousal estimation value and a valence estimation value, which are indices indicating an emotion of the person, are output.

The evaluation calculation unit 106 calculates an evaluation of the second person by the first person based on the emotion estimated by the emotion analysis unit 105 (information about the estimated emotion). The evaluation calculation unit 106 calculates an evaluation score based on, for example, the arousal estimation value and the valence estimation value. For example, the evaluation calculation unit 106 calculates the evaluation score using a calculation formula in which the lower the arousal estimation value, the higher the evaluation score, and the higher the valence estimation value, the higher the evaluation score. A lower arousal estimation value indicates a non-arousal state, and a higher arousal estimation value indicates an arousal state. In addition, a lower valence estimation value indicates discomfort, and a higher valence estimation value indicates comfort.

The evaluation calculation unit 106 generates information in which the person-in-charge information generated by the relationship specifying unit 104 is associated with the calculated evaluation score. FIG. 10 is an example of information generated by the evaluation calculation unit 106 by associating evaluation scores with the person-in-charge information. As illustrated in FIG. 10, the evaluation calculation unit 106 associates evaluation scores with information on second persons in charge of the first person. The evaluation calculation unit 106 may further associate the classification of the Russell's circumplex model in addition to the evaluation scores. The evaluation calculation unit 106 outputs the generated information to the relationship specifying unit 104.

(Operation of Control Device 100)

Figure 11:
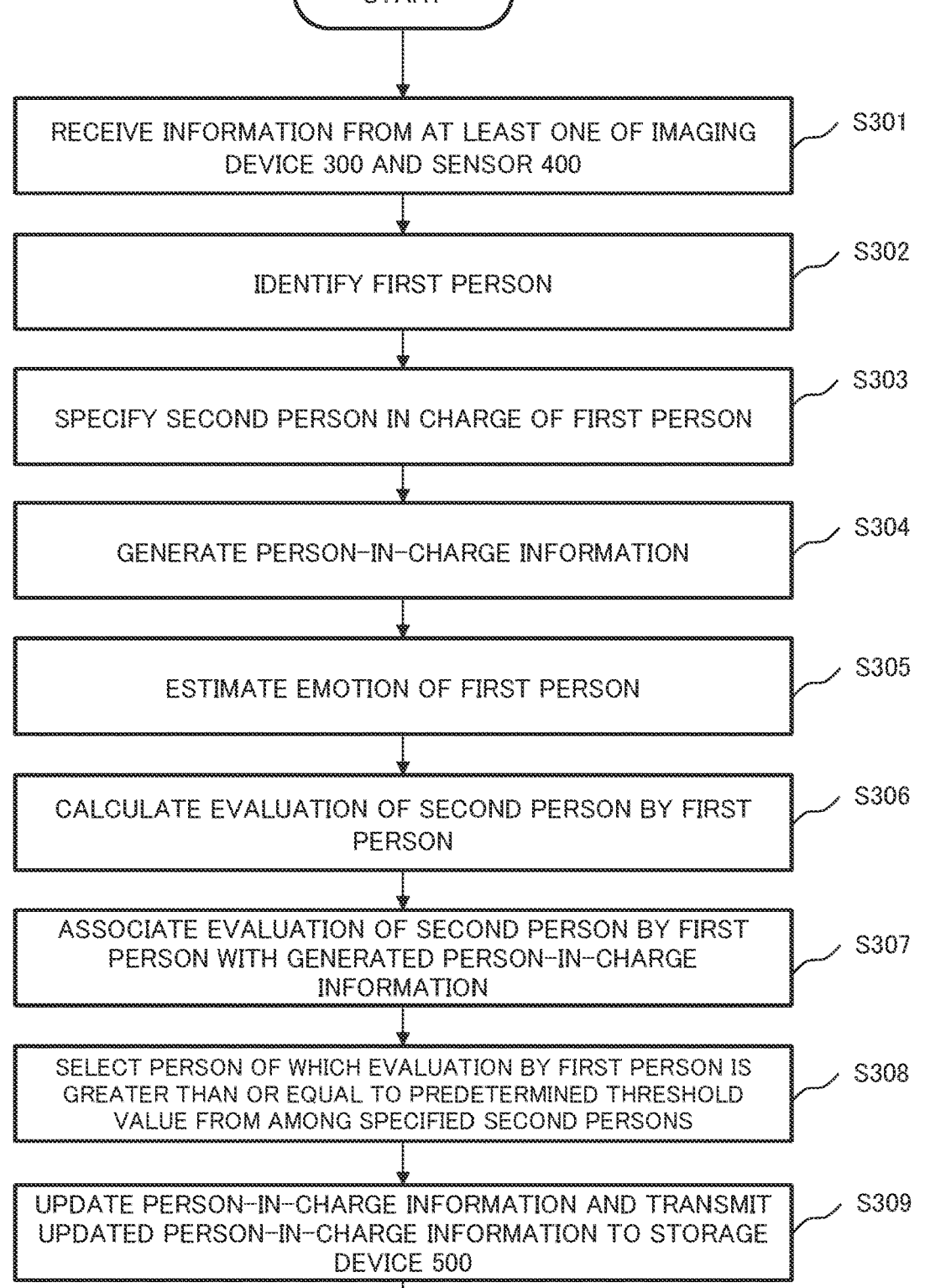
FIG. 11 is a flowchart illustrating an example of an operation of preprocessing of a control device 100 according to the third example embodiment.

Next, an example of an operation of the control device 100 according to the third example embodiment will be described with reference to FIG. 11.

The control device 100 according to the third example embodiment performs an operation related to generation of person-in-charge information as preprocessing. Thereafter, the operation for giving a control instruction to the robot 200 is performed. Since the operation for giving a control instruction to the robot 200 is similar to the processing in steps S101 to S103 in the first example embodiment or in the second example embodiment, the description thereof will be omitted.

First, the control device 100 performs the processing in steps S301 to S304. Since the processing in steps S301 to S304 is similar to the processing in steps S201 to S204 in the second example embodiment, the description thereof will be omitted.

When the processing in step S304 is completed, the emotion analysis unit 105 estimates an emotion of the first person (step S305). Specifically, the emotion analysis unit 105 estimates an emotion of the first person when the service is provided from the second person based on the information acquired from the imaging device 300 or the sensor 400.

Next, the evaluation calculation unit 106 calculates an evaluation of the second person by the first person (step S306). Specifically, the evaluation calculation unit 106 calculates an evaluation score based on the emotion of the first person estimated in step S305.

Next, the evaluation calculation unit 106 generates information in which the person-in-charge information generated by the relationship specifying unit 104 is associated with the calculated evaluation score (step S307). The evaluation calculation unit 106 outputs the generated information to the relationship specifying unit 104.

Next, the relationship specifying unit 104 selects a person of which an evaluation by the first person is equal to or greater than a predetermined threshold value, from among the second persons specified in step S303, based on the information acquired from the evaluation calculation unit 106 (step S308).

Next, the relationship specifying unit 104 updates the person-in-charge information with the second person selected in step S308 as the person in charge of the first person. Then, the relationship specifying unit 104 transmits the updated person-in-charge information to the storage device 500 (step S309). When the series of steps described above is completed, the control device 100 ends the operation of preprocessing.

Effects

The control device 100 according to the third example embodiment is configured as described above. Next, effects of the third example embodiment will be described. The control device 100 according to the third example embodiment can obtain the following effects in addition to the effects of the first example embodiment and the second example embodiment.

The control device 100 according to the third example embodiment includes an emotion analysis unit 105 that estimates an emotion of the first person, an evaluation calculation unit 106 that calculates an evaluation based on the emotion estimated by the emotion analysis unit 105, and a relationship specifying unit 104 that selects a second person of which an evaluation by the first person is equal to or greater than a predetermined threshold value as a person in charge. With the above-described configuration, the control device 100 according to the third example embodiment is capable of generating person-in-charge information according to the preference of the user in the process of model learning for generating an action model or in the process before the control operation performed by the robot. Therefore, the robot can be controlled in accordance with the action model of the second person corresponding to the user's preferred person in charge.

Modification

The providing system 1000 and the control device 100 according to the third example embodiment may be modified as follows.

In the third example embodiment, the evaluation by the first person is calculated by the evaluation calculation unit 106 based on the emotion estimated by the emotion analysis unit 105, but the evaluation may be calculated by a method other than the above-described method. For example, the control device 100 may be configured to receive an input of an evaluation from an external input device.

Figure 12:
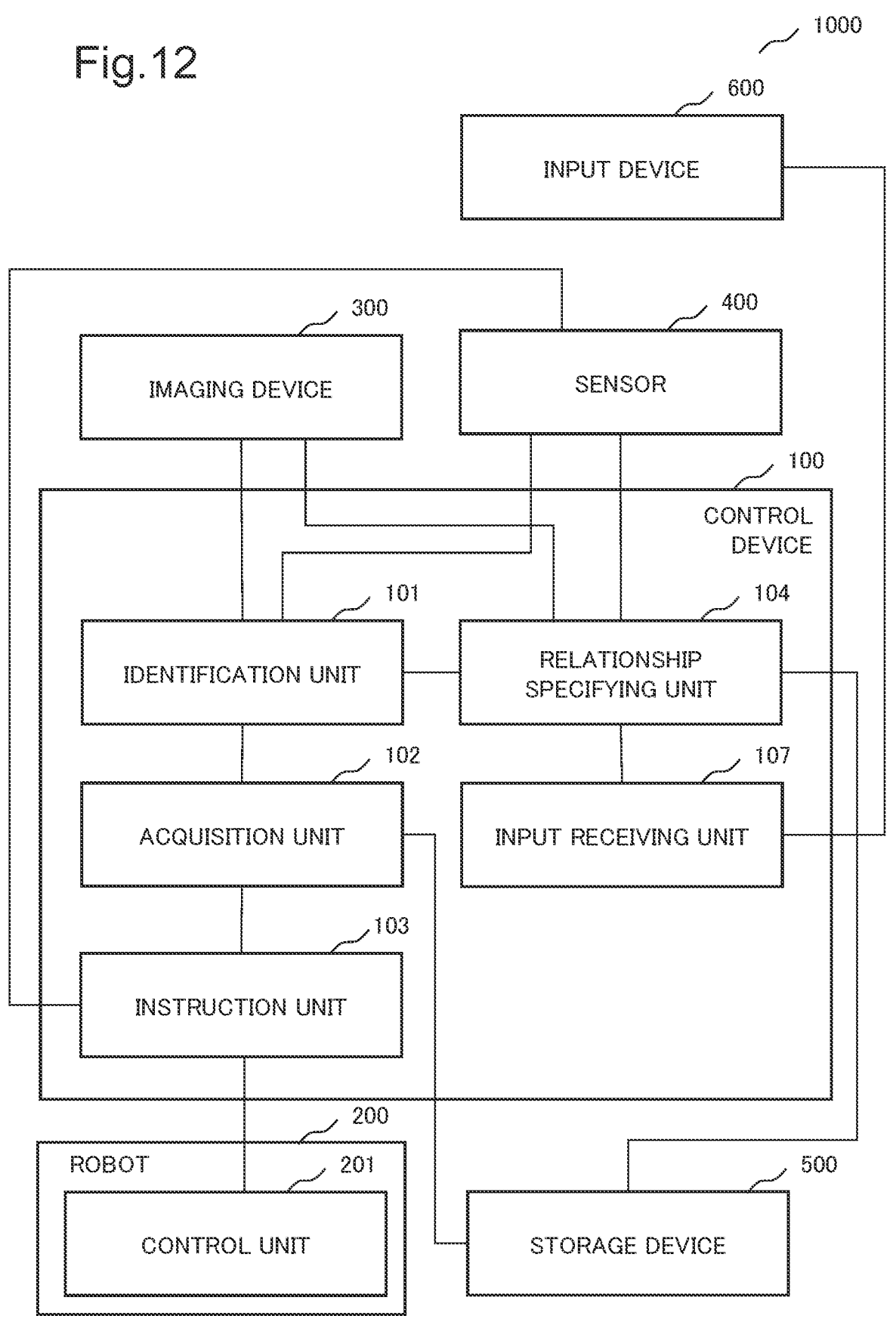
FIG. 12 is a diagram illustrating an example of a modified configuration of the control device 100 according to the third example embodiment.

FIG. 12 is a diagram illustrating an example of a modified configuration of the control device 100 according to the third example embodiment. A providing system 1000 illustrated in FIG. 12 includes an input device 600 in addition to the control device 100, the robot 200, the imaging device 300, the sensor 400, and the storage device 500.

The input device 600 is an input means for inputting an evaluation by the first person. The input device 600 is communicably connected to the control device 100. The input device 600 is achieved by, for example, a smartphone or a tablet terminal possessed by the first person. For example, the user inputs an evaluation score for the second person.

The control device 100 includes an identification unit 101, an acquisition unit 102, an instruction unit 103, a relationship specifying unit 104, and an input receiving unit 107. The input receiving unit 107 receives an input of the evaluation from the first person. Specifically, the input receiving unit 107 receives an input of the evaluation by the user from the input device 600. The relationship specifying unit selects a person of which the input evaluation is equal to or greater than a predetermined threshold value.

Even if the providing system 1000 and the control device 100 according to the third example embodiment are modified as described above, effects similar to the above-described effects can be obtained.

Fourth Example Embodiment

Hereinafter, a fourth example embodiment according to the present disclosure will be described. A providing system 1000 according to the fourth example embodiment can be applied to, for example, a physicalcare service or a customer service as described in the example of application of the first example embodiment. In the description of the fourth example embodiment, the same components as those of the first example embodiment will be denoted by the same reference signs, and the detailed description thereof will be omitted.

(Configuration of Providing System 1000)

FIG. 13 is a diagram illustrating an example of a configuration of the providing system 1000 according to the fourth example embodiment. As illustrated in FIG. 13, the providing system 1000 includes a control device 100, a robot 200, an imaging device 300, a sensor 400, and a storage device 500. The details of the robot 200 and the imaging device 300 are similar to those described in the first example embodiment, and thus the description thereof will be omitted here.

The sensor 400 acquires one or both of the following kinds of information to be used by the identification unit 101 for processing of identifying a user.

Physical feature (fingerprint or voiceprint) of user

Distance between robot 200 and user

In addition, the sensor 400 acquires, for example, voice information of the user to be used for processing performed by a person information acquisition unit 108.

The storage device 500 holds information necessary for the processing of the control device 100. The storage device 500 holds four kinds of information as follows.

Physical feature of first person

Person-in-charge information

Action model of second person

Physiological data of first person

The physical feature of the first person and the person-in-charge information are as described in the first example embodiment.

In the action model of the second person, identification information of the provider is associated with a service to be provided to the first person. FIG. 14 is a diagram for explaining an action model of a second person held by the storage device 500 according to the fourth example embodiment. As illustrated in FIG. 14, the storage device 500 holds an action model generated in model learning for each service provided to the first person. In addition, as illustrated in FIG. 14, the storage device 500 may associate a physical condition of the first person in addition to identification information of the provider and a service provided to the first person with an action model of the second person. The information associated and stored in the storage device 500 is generated and stored in the process of model learning. For example, as illustrated in FIG. 14, a walking assistance model when the physical condition of the first person is good and a walking assistance model when the physical condition of the first person is bad may be separately prepared.

The physiological data of the user refers to, for example, a heart rate, a blood pressure, a body temperature, a perspiration amount, and brain waves of the user. Therefore, the sensor 400 is achieved by, for example, a wearable terminal. The physiological data of the user is used by the person information acquisition unit 108 to estimate a physical condition of the user.

(Configuration of Control Device 100)

As illustrated in FIG. 13, the control device 100 includes an identification unit 101, an acquisition unit 102, an instruction unit 103, and a person information acquisition unit 108. Since the identification unit 101 and the acquisition unit 102 are similar to those described in the first example embodiment, the description thereof will be omitted here.

The person information acquisition unit 108 estimates a state of the first person. Specifically, the person information acquisition unit 108 estimates a state of the user based on at least one of the image acquired from the imaging device 300 or the information acquired from the sensor 400. Specifically, the state of the user includes information on a service that the user currently needs and information on a physical condition of the user. For example, it is assumed that the first person is a physicalcare receiver. The person information acquisition unit 108 estimates that the physicalcare receiver is in a state in which meal assistance is required, based on at least one of the image acquired from the imaging device 300 and the information acquired from the sensor 400.

The instruction unit 103 reads out an action with respect to the first person based on the information on the second person acquired by the acquisition unit 102 and the state of the first person estimated by the person information acquisition unit 108.

(Operation of Control Device 100)

Next, an example of an operation of the control device 100 according to the fourth example embodiment will be described with reference to FIG. 15. Since the processing in steps S401 and S402 is the same as the processing in steps S101 and S102 in the first example embodiment, the description thereof will be omitted here.

When the processing in step S402 is completed, the person information acquisition unit 108 estimates a state of the first person (step S403). Specifically, the person information acquisition unit 108 estimates a state of the user from at least one of the image captured by the imaging device 300 and the information acquired by the sensor 400.

Next, the instruction unit 103 reads out an action model of the second person based on the information on the second person acquired by the acquisition unit 102 and the state of the first person estimated by the person information acquisition unit 108 (step S404). When the series of steps described above is completed, the control device 100 ends the processing.

Effects

The providing system 1000 and the control device 100 according to the fourth example embodiment are configured as described above. Next, effects of the fourth example embodiment will be described. The control device 100 according to the fourth example embodiment can obtain the following effects in addition to the effects of the first example embodiment.

The control device 100 according to the fourth example embodiment includes a person information acquisition unit 108 that estimates a state of the first person, and the instruction unit 103 reads our an action model of the second person based on the information on the second person acquired by the acquisition unit 102 and the state of the first person estimated by the person information acquisition unit 108. With the above-described configuration, the control device 100 according to the fourth example embodiment can cope with a case where a plurality of action models relevant to states of the first person are held in the storage device 500. That is, the control device 100 according to the fourth example embodiment is capable of controlling the robot 200 to provide a plurality of services relevant to the states of the first person.

Modification

The control device 100 according to the fourth example embodiment may be modified as follows.

In the present example embodiment, the control device 100 includes an identification unit 101, an acquisition unit 102, an instruction unit 103, and a person information acquisition unit 108, but is not limited to this configuration. For example, the control device 100 may include a relation-ship specifying unit 104 in addition to the above-described configuration. In a case where the control device 100 is configured in this manner, the control device 100 can obtain the effects described in the second example embodiment in addition to the above-described effects of the fourth example embodiment. In addition, the control device 100 may include a relationship specifying unit 104, an emotion analy-sis unit 105, and an evaluation calculation unit 106 in addition to the above-described configuration. In addition, the control device 100 may include a relationship specifying unit 104 and an input receiving unit 107 in addition to the above-described configuration. In a case where the control device 100 is configured in this manner, the control device 100 can obtain the effects described in the third example embodiment in addition to the above-described effects of the fourth example embodiment.

[Hardware Configuration by Computer]

Each component in each example embodiment of the present disclosure described above can be achieved not only by hardware but also by a computer device or firmware based on program control.

Figure 16:
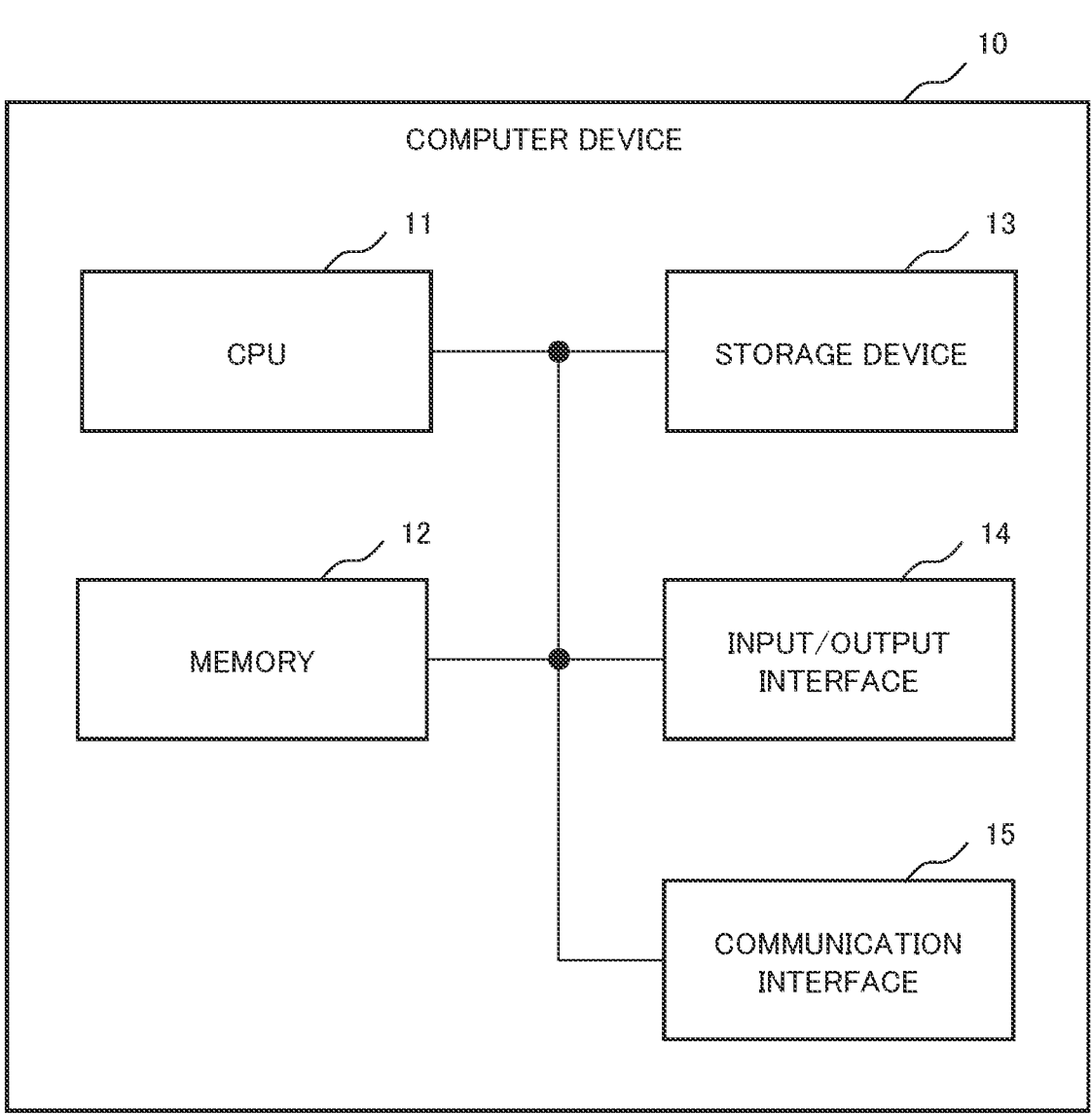
FIG. 16 is a diagram illustrating an example of a hardware configuration in which the control device 100 according to the present disclosure is achieved by a computer device 10 including a processor.

FIG. 16 is a diagram illustrating an example of a hardware configuration in which the control device 100 according to the present disclosure is achieved by a computer device 10 including a processor. The control device 100 according to each example embodiment is achieved by the computer device 10. As illustrated in FIG. 12, the computer device 10 includes a CPU 11, a memory 12, a storage device 13 such as a hard disk that stores a program, an input/output interface 14 for connection to an input device and an output device, and a communication interface 15 for connection to a network.

The CPU 11 operates an operating system to control the entire control device 100 according to the present disclosure. For example, the CPU 11 reads out a program or data from a storage medium attached to a drive device or the like into the memory 12. Furthermore, the CPU 11 functions as, for example, partial sections of the identification unit 101, the acquisition unit 102, the instruction unit 103, the relation-ship specifying unit 104, the evaluation calculation unit 106, the emotion analysis unit 105, the input receiving unit 107, and the person information acquisition unit 108 in the control device 100 according to the present disclosure, and executes processing or commands based on the program.

The storage device 13 is, for example, an optical disk, a flexible disk, a magnetic optical disk, an external hard disk, a semiconductor memory, or the like. A partial section of the storage medium of the storage device is a non-volatile storage device, and records a program therein. In addition, the program may be downloaded from an external computer (not illustrated) connected to a communication network.

The input device connected to the input/output interface 14 is achieved by, for example, a mouse, a keyboard, or the like, and is used for an input operation. Similarly, the output device connected to the input/output interface 14 is achieved by, for example, a display or the like, and is used to display and confirm an output result.

Although the present disclosure has been particularly shown and described with reference to example embodi-ments, the present disclosure is not limited to these embodi-ments. It will be understood by those of ordinary skill in the art that various changes in form and details may be made therein without departing from the spirit and scope of the present disclosure as defined by the claims. For example, although a plurality of operations are described in order in the form of a flowchart, the order in which the operations are described does not limit an order in which the plurality of operations are executed. Therefore, when each example embodiment is implemented, the order in which the plurality of operations are executed can be changed if the content is not affected by the change.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodi-ments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed disclosure even if the claims are amended during prosecution.

The invention claimed is:

1. A control device comprising:
    one or more memories storing instructions; and
    one or more processors configured to execute the instruc-tions to:
        identify a first person, the identifying including receiv-ing at least one of an image from an imaging device or physical-feature data from a sensor;
        acquire information on a second person related to the first person;
        read out an action information using the information on the second person, the action information represent-ing an action of the second person for the first person;
        generate, based on the action information, a control instruction including at least one of a grip position, an applied force, a movement speed, a timing of utterance, or an angle;

transmit the control instruction to a robot to cause the robot to perform the action for the first person, the transmitting being triggered by a distance between the robot and the first person detected by a sensor being equal to or smaller than a predetermined threshold;

adjust, during execution of the action by the robot, the control instruction using the distance between the robot and the first person acquired from the sensor;

specify a person in charge of the first person as the second person;

determine, as the second person, a person of which an evaluation by the first person is equal to or greater than a predetermined threshold value; and receive, from the first person, an input of the evaluation.

2. The control device according to claim 1, wherein the action information includes a feature of the action taken by the second person with respect to the first person.

3. The control device according to claim 2, wherein the one or more processors are configured to execute the instructions to: estimate a person in charge of the first person, using at least one of a distance between persons, a time when the distance is equal to or smaller than a predetermined threshold value, conversation information between persons, an action relationship between persons, or attribute information of persons; and specify the estimated person in charge as the second person.

4. The control device according to claim 3, wherein the one or more processors are further configured to execute the instructions to: estimate an emotion of the first person; and calculate the evaluation using information about the estimated emotion.

5. The control device according to claim 2, wherein the information on the second person is acquired using a model generated by machine learning, and the action information includes information about an optimized service for the first person.

6. The control device according to claim 1, wherein the one or more processors are further configured to execute the instructions to:

estimate a state of the first person; and read out the action information using the information on the second person and information on the estimated state of the first person.

7. The control device according to claim 1, wherein the first person is a user of a service, and the second person is a provider of the service.

8. The control device according to claim 7, wherein the one or more processors are configured to execute the instructions to read out the action information from an action model of the second person generated using information in which data indicating a state of the first person is associated with data regarding the action of the second person performed in the state of the first person.

9. The control device according to claim 8, wherein the service is a physical care service, the user of the service is a physical care receiver, and the provider of the service is a physical care giver in charge of the physical care receiver.

10. The control device according to claim 8, wherein the service is a customer service, the user of the service is a customer, and the provider of the service is a store clerk in charge of servicing the customer.

11. The control device of claim 1, wherein the one or more processors are configured to:

support decision-making by the first person by presenting a confirmation regarding the service and receiving, from the first person, an input indicating approval or disapproval; and control the robot based on the decision.

12. A control method performed by a computer, the control method comprising:

identifying a first person, the identifying including receiving at least one of an image from an imaging device or physical-feature data from a sensor;

acquiring information on a second person related to the first person;

reading out an action information using the information on the second person, the action information representing an action of the second person for the first person;

generating, based on the action information, a control instruction including at least one of a grip position, an applied force, a movement speed, a timing of utterance, or an angle;

transmitting the control instruction to a robot to cause the robot to perform the action for the first person, the transmitting being triggered by a distance between the robot and the first person detected by a sensor being equal to or smaller than a predetermined threshold;

adjusting, during execution of the action by the robot, the control instruction using the distance between the robot and the first person acquired from the sensor;

specifying a person in charge of the first person as the second person;

determining, as the second person, a person of which an evaluation by the first person is equal to or greater than a predetermined threshold value; and receiving, from the first person, an input of the evaluation.

13. The control method according to claim 12, further comprising:

estimating a state of the first person; and reading out the action information using the information on the second person and information on the estimated state of the first person.

14. The control method according to claim 12, wherein the first person is a user of a service, and the second person is a provider of the service.

15. The control method according to claim 14, wherein the service is a physical care service, the user of the service is a physical care receiver, and the provider of the service is a physical care giver in charge of the physical care receiver.

16. The control method according to claim 12, further comprising:

supporting decision-making by the first person by presenting a confirmation regarding the service and receiving, from the first person, an input indicating approval or disapproval; and controlling the robot based on the decision.

17. A non-transitory recording medium recording a program for causing a computer to execute:

identifying a first person, the identifying including receiving at least one of an image from an imaging device or physical-feature data from a sensor;

acquiring information on a second person related to the first person;

reading out an action information using the information on the second person, the action information representing an action of the second person for the first person;

generating, based on the action information, a control instruction including at least one of a grip position, an applied force, a movement speed, a timing of utterance, or an angle;

transmitting the control instruction to a robot to cause the robot to perform the action for the first person, the transmitting being triggered by a distance between the robot and the first person detected by a sensor being equal to or smaller than a predetermined threshold;

adjusting, during execution of the action by the robot, the control instruction using the distance between the robot and the first person acquired from the sensor;

specifying a person in charge of the first person as the second person;

determining, as the second person, a person of which an evaluation by the first person is equal to or greater than a predetermined threshold value; and receiving, from the first person, an input of the evaluation.

18. The non-transitory recording medium according to claim 17, wherein the program further causes the computer to execute:

estimating a state of the first person; and reading out the action information using the information on the second person and information on the estimated state of the first person.

19. The non-transitory recording medium according to claim 17, wherein the program further causes the computer to execute:

supporting decision-making by the first person by presenting a confirmation regarding the service and receiving, from the first person, an input indicating approval or disapproval; and controlling the robot based on the decision.

\* \* \* \* \*